(12) United States Patent
Yi et al.

(10) Patent No.: US 9,178,674 B2
(45) Date of Patent: Nov. 3, 2015

(54) METHOD AND APPARATUS FOR TRANSMITTING REFERENCE SIGNALS

(71) Applicant: LG ELECTRONICS INC., Seoul (KR)

(72) Inventors: Yunjung Yi, Anyang-si (KR); Suckchel Yang, Anyang-si (KR); Joonkui Ahn, Anyang-si (KR); Bonghoe Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/390,347

(22) PCT Filed: Apr. 3, 2013

(86) PCT No.: PCT/KR2013/002783
§ 371 (c)(1),
(2) Date: Oct. 2, 2014

(87) PCT Pub. No.: WO2013/151338
PCT Pub. Date: Oct. 10, 2013

(65) Prior Publication Data
US 2015/0078465 A1  Mar. 19, 2015

Related U.S. Application Data

(60) Provisional application No. 61/619,924, filed on Apr. 3, 2012, provisional application No. 61/646,236, filed on May 11, 2012, provisional application No. 61/646,248, filed on May 11, 2012, provisional application No. 61/655,490, filed on Jun. 5, 2012, provisional application No. 61/714,707, filed on Oct. 16, 2012.

(51) Int. Cl.
*H04L 5/14* (2006.01)
*H04L 5/00* (2006.01)
*H04L 27/26* (2006.01)

(52) U.S. Cl.
CPC .............. *H04L 5/0048* (2013.01); *H04L 5/001* (2013.01); *H04L 5/0053* (2013.01); *H04L 27/2601* (2013.01); *H04L 27/2613* (2013.01); *H04L 5/0023* (2013.01)

(58) Field of Classification Search
CPC ........ H04B 1/7073; H04B 7/26; H04B 7/216; H04J 3/00; H04J 11/00; H04J 3/02; H04J 3/06; H04L 5/14; H04L 12/26; H04L 12/28; H04L 27/28; H04L 5/00; H04L 5/0032; H04L 5/0053; H04L 5/0077; H04L 7/00; H04L 25/02; H04L 27/26; H04W 4/00; H04W 28/00; H04W 52/24; H04W 72/04; H04W 8/00; H04W 24/00; H04W 24/08; H04W 24/10; H04W 36/00; H04W 36/06; H04W 48/16; H04W 56/00; H04W 72/00; H04W 72/0413; H04W 72/0543; H04W 88/08
USPC ......... 370/203, 252, 254, 280, 329, 335, 341, 370/311, 312, 330, 336, 350; 375/219, 260, 375/295, 316, 354–356, 150, 227; 709/238, 709/241; 455/434, 550.1, 452.1
See application file for complete search history.

(56) References Cited

U.S. PATENT DOCUMENTS 7,639,635 B2 * 12/2009 Anderson et al. ............. 370/280
7,986,681 B2 *  7/2011 Astely et al. .................. 370/341
(Continued)

FOREIGN PATENT DOCUMENTS

KR   10-2009-0095592 A   9/2009
KR   10-2010-0092475 A   8/2010
(Continued)

*Primary Examiner* — Sam K Ahn
*Assistant Examiner* — Shawkat M Ali
(74) *Attorney, Agent, or Firm* — Birch, Stewart, Kolasch & Birch, LLP

(57) ABSTRACT

Provided is a method for transmitting a reference signal in a time division duplex (TDD)-based wireless communication system. A base station transmits a synchronization signal in a subframe including N resource blocks in a frequency domain, and K (K>1) orthogonal frequency division multiplexing (OFDM) symbols in a time domain. The base station transmits a reference signal generated on the basis of a terminal identifier in the subframe. The subframe includes a downlink pilot time slot (DwPTS), a guard period (GP), and an uplink pilot time slot (UpPTS). The DwPTS includes six OFDM symbols. The UpPTS includes two OFDM symbols. The reference signal is transmitted in the first OFDM symbol or the sixth OFDM symbol in the subframe.

4 Claims, 22 Drawing Sheets

(56) References Cited

U.S. PATENT DOCUMENTS

| | | | |
|---|---|---|---|
| 8,526,295 B2* | 9/2013 | Lin et al. | 370/203 |
| 8,537,724 B2* | 9/2013 | Love et al. | 370/280 |
| 8,929,230 B2* | 1/2015 | Wang et al. | 370/252 |
| 2008/0137562 A1* | 6/2008 | Li et al. | 370/280 |
| 2008/0144530 A1* | 6/2008 | Che et al. | 370/254 |
| 2009/0180435 A1 | 7/2009 | Sarkar | |
| 2009/0201838 A1* | 8/2009 | Zhang et al. | 370/280 |
| 2010/0027446 A1 | 2/2010 | Choi et al. | |
| 2010/0202328 A1* | 8/2010 | Liu et al. | 370/280 |
| 2010/0246455 A1* | 9/2010 | Nangia et al. | 370/280 |
| 2010/0246456 A1* | 9/2010 | Suo et al. | 370/280 |
| 2010/0278083 A1* | 11/2010 | Kwak et al. | 370/280 |
| 2011/0044215 A1* | 2/2011 | Kim et al. | 370/280 |
| 2011/0096702 A1* | 4/2011 | Dai et al. | 370/294 |
| 2011/0122825 A1* | 5/2011 | Lee et al. | 370/328 |
| 2011/0122837 A1 | 5/2011 | Lin et al. | |
| 2011/0188414 A1* | 8/2011 | Dai et al. | 370/280 |
| 2011/0292847 A1 | 12/2011 | Yoon et al. | |
| 2011/0317641 A1* | 12/2011 | Noh et al. | 370/329 |
| 2012/0008574 A1* | 1/2012 | Xiao et al. | 370/329 |

FOREIGN PATENT DOCUMENTS

| | | |
|---|---|---|
| KR | 10-2010-0106577 A | 10/2010 |
| KR | 10-2011-0034618 A | 4/2011 |
| KR | 10-2011-0132180 A | 12/2011 |

\* cited by examiner

METHOD AND APPARATUS FOR TRANSMITTING REFERENCE SIGNALS

CROSS REFERENCE TO RELATED APPLICATIONS

This application is the National Phase of PCT International Application No. PCT/KR2013/002783, filed on Apr. 3, 2013, which claims priority under 35 U.S.C. 119(e) to U.S. Provisional Application Nos. 61/619,924, filed on Apr. 3, 2012, 61/646,236, filed on May 11, 2012, 61/646,248, filed on May 11, 2012, 61/655,490 filed on Jun. 5, 2012 and 61/714,707 filed on Oct. 16, 2012, all of which are hereby expressly incorporated by reference into the present application.

BACKGROUND OF THE INVENTION

1. Field of the Invention

The present invention relates to wireless communication and, more particularly, to a method for transmitting reference signals in a wireless communication system based on Time Division Duplex (TDD) and an apparatus using the same.

2. Related Art

Long Term Evolution (LTE) based on 3rd Generation Partnership Project (3GPP) Technical Specification (TS) release 8 is a strong next-generation mobile communication standard. Recently, the standardization of LTE-Advanced (LTE-A) based on 3GPP TS release 10 which supports multiple carriers is in progress.

As disclosed in 3GPP TS 36.211 V10.4.0 (2011-12) "Evolved Universal Terrestrial Radio Access (E-UTRA); Physical Channels and Modulation (Release 10)", reference signals, such as a Cell-specific Reference Signal (CRS), a Primary Synchronization Signal (PSS), and a Secondary Synchronization Signal (SSS), and control channels, such as a physical downlink control channel (PDCCH) and a physical broadcast channel (PBCH), are defined in the physical layer of 3GPP LTE/LTE-A.

3GPP LTE supports both Frequency Division Duplex (FDD) and Time Division Duplex (TDD). In FDD, uplink (UL) transmission and downlink (DL) reception are performed in different frequencies. In TDD, uplink (UL) transmission and downlink (DL) reception are performed in the same frequency. A terminal supporting full-duplex FDD is capable of simultaneous UL transmission and DL reception at a specific time. A terminal supporting half-duplex FDD and TDD is incapable of simultaneous UL transmission and DL reception.

Meanwhile, in LTE releases 8/9/10, reference signals and control channels are transmitted in all the DL subframes. In the next-generation system, however, in order to more efficiently use radio resources, it is expected that a new type of a carrier in which some or all of reference signals and control channels are not transmitted will be introduced. Such a carrier type is called a New Carrier Type (NCT).

SUMMARY OF THE INVENTION

An object of the present invention is to provide a method for transmitting reference signals in a wireless communication system based on Time Division Duplex (TDD) and an apparatus using the same.

Another object of the present invention is to provide a method for receiving reference signals in a wireless communication system based on TDD and an apparatus using the same.

Yet another object of the present invention is to provide a method for transmitting a synchronization signal, such as a CRS and a PSS/SSS, and/or a DM-RS in a TDD special subframe and an apparatus using the same.

Further yet another object of the present invention is to provide a method for receiving a synchronization signal, such as a CRS and a PSS/SSS, and/or a DM-RS in a TDD special subframe and an apparatus using the same.

In an aspect, a method for transmitting reference signals in a wireless communication system based on Time Division Duplex (TDD) is provided. The method includes transmitting a synchronization signal in a subframe, the subframe comprising K (K>1) Orthogonal Frequency Division Multiplexing (OFDM) symbols in a time domain and N resource blocks in a frequency domain, and transmitting a reference signal in the subframe, the reference signal being generated based on a user equipment's identifier.

In another aspect, a method for receiving reference signals in a wireless communication system based on Time Division Duplex (TDD) is provided. The method includes receiving a reference signal in a subframe, the subframe comprising K (K>1) Orthogonal Frequency Division Multiplexing (OFDM) symbols in a time domain and N resource blocks in a frequency domain, and demodulating a control channel or downlink data based on the reference signal.

In still another aspect, a user equipment in a wireless communication system is provided. The user equipment includes a Radio Frequency (RF) unit configured to transmit and receive radio signals, and a processor connected to the RF unit and configured to receive a reference signal in a subframe, the subframe comprising K (K>1) Orthogonal Frequency Division Multiplexing (OFDM) symbols in a time domain and N resource blocks in a frequency domain, and demodulate a control channel or downlink data based on the reference signal.

The subframe may comprises a Downlink Pilot Time Slot (DwPTS), a Guard Period (GP), and an Uplink Pilot Time Slot (UpPTS). The DwPTS may comprises 6 OFDM symbols. The UpPTS may comprises 2 OFDM symbols. The reference signal may be received/transmitted in at least one of a first OFDM symbol to a sixth OFDM symbol of the subframe.

The DwPTS may carry a downlink control channel demodulated by the reference signal.

The reference signal may be transmitted in the second, the third, the fifth, and the sixth OFDM symbols of the subframe.

The synchronization signal may be transmitted in at least one of the first and the fourth OFDM symbols.

The synchronization signal may include a Primary Synchronization Signal (PSS) or a Secondary Synchronization Signal (SSS).

The performance of UE is improved.

DESCRIPTION OF EXEMPLARY EMBODIMENTS

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). IEEE 802.16m is the evolution of IEEE 802.16e, and it provides backward compatibility with systems based on IEEE 802.16e. UTRA is part of a Universal Mobile Telecommunications System (UMTS). $3^{rd}$ Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

User Equipment (UE) may be fixed or mobile and may also be called another terminology, such as a Mobile Station (MS), a Mobile Terminal (MT), a User Terminal (UT), a Subscriber Station (SS), a wireless device, a Personal Digital Assistant (PDA), a wireless modem, or a handheld device.

In general, a Base Station (BS) refers to a fixed station communicating with UE. The BS may also be called another terminology, such as an evolved-NodeB (eNB), a Base Transceiver System (BTS), or an access point.

Hereinafter, the application of the present invention based on 3GPP LTE based on 3GPP release 8 is described. This application is illustrative, and the present invention may be applied to a variety of wireless communication networks. LTE hereinafter includes LTE and/or LTE-A.

3GPP LTE supports both Frequency Division Duplex (FDD) and Time Division Duplex (TDD). In FDD, UL transmission and DL reception occur at same frequency. A UE that supports full duplex can simultaneously perform DL transmission and UL reception. A UE that supports half duplex cannot simultaneously perform DL transmission and UL reception.

Figure 1:
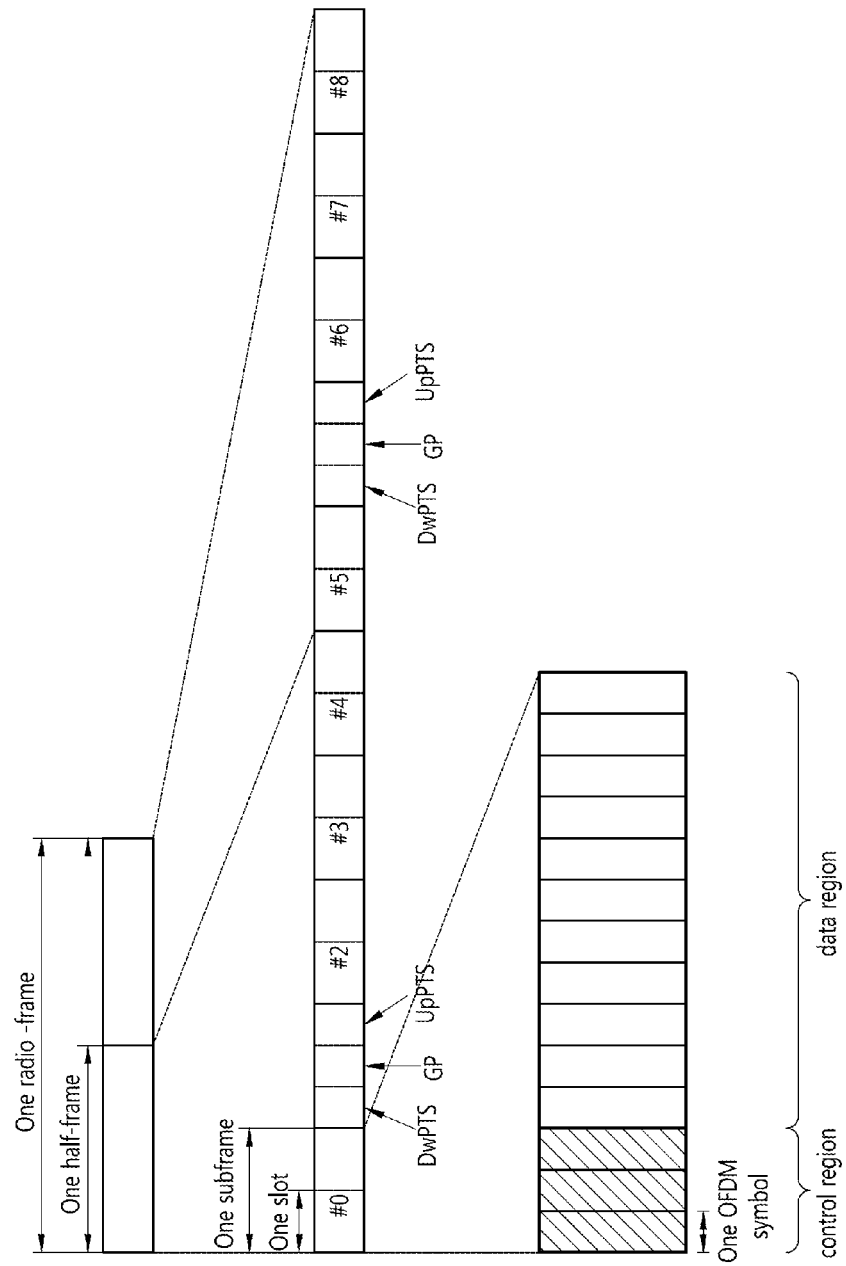
FIG. 1 illustrates the configuration of a radio frame for Time Division Duplex (TDD) in 3rd Generation Partnership Project (3GPP) Long Term Evolution (LTE).

FIG. 1 illustrates the configuration of a radio frame in 3GPP LTE.

For the structure, reference may be made to section 4 of 3rd Generation Partnership Project (3GPP) TS 36.211 V10.3.0 (2011-09) "Technical Specification Group Radio Access Network; Evolved Universal Terrestrial Radio Access (E-UTRA); Physical channels and modulation (Release 10)".

Referring to FIG. 1, a radio frame includes 10 subframes. A subframe includes two contiguous slots. The slots within the radio frame are assigned slot numbers #0 to #19. The time that is taken to send a single subframe is called a Transmission Time Interval (TTI). The 111 may be a scheduling unit for data transmission. For example, the length of a single radio frame may be 10 ms, the length of a single subframe may be 1 ms, and the length of a single slot may be 0.5 ms.

A single slot includes a plurality of Orthogonal Frequency Division Multiplexing (OFDM) symbols in a time domain and includes a plurality of subcarriers in a frequency domain. The OFDM symbol is for representing a single symbol period because 3GPP LTE uses OFDMA in downlink and may be called another terminology depending on multiple access methods. For example, if SC-FDMA is used as an uplink multiple access scheme, an OFDM symbol may be called an SC-FDMA symbol. A Resource Block (RB) is a resource allocation unit, and the RB includes a plurality of contiguous subcarriers in a single slot.

The structure of the radio frame shown in FIG. 1 is only an example. Accordingly, the number of subframes included in a radio frame, the number of slots included in a subframe, or the number of OFDM symbols included in a slot may be changed in various ways. In 3GPP LTE, a single slot is defined to include 7 OFDM symbols in a normal Cyclic Prefix (CP), and a single slot is defined to include 6 OFDM symbols in an extended CP.

Subframes having indexes #1 and #6 may be referred as a special subframe that includes a downlink pilot time slot (DwPTS), a guard period (GP) and a uplink pilot time slot (UpPTS). The DwPTS can be used for initial cell search, synchronization or channel estimation. The UpPTS can be used for channel estimation at a BS and uplink time alignment with a UE. The GP is an interval for mitigating an uplink interference due to a multi-path delay between DL and UL.

In TDD, a radio frame includes at least one DL subframe and at least on UL subframe as shown below.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

'D' denote a DL subframe 'U' denote a UL subframe and 'S' denotes a special subframe. When UL-DL configuration is received from a BS, a UE can acknowledges which subframe is a DL subframe or a UL subframe in accordance with the UL-DL configuration.

Figure 2:
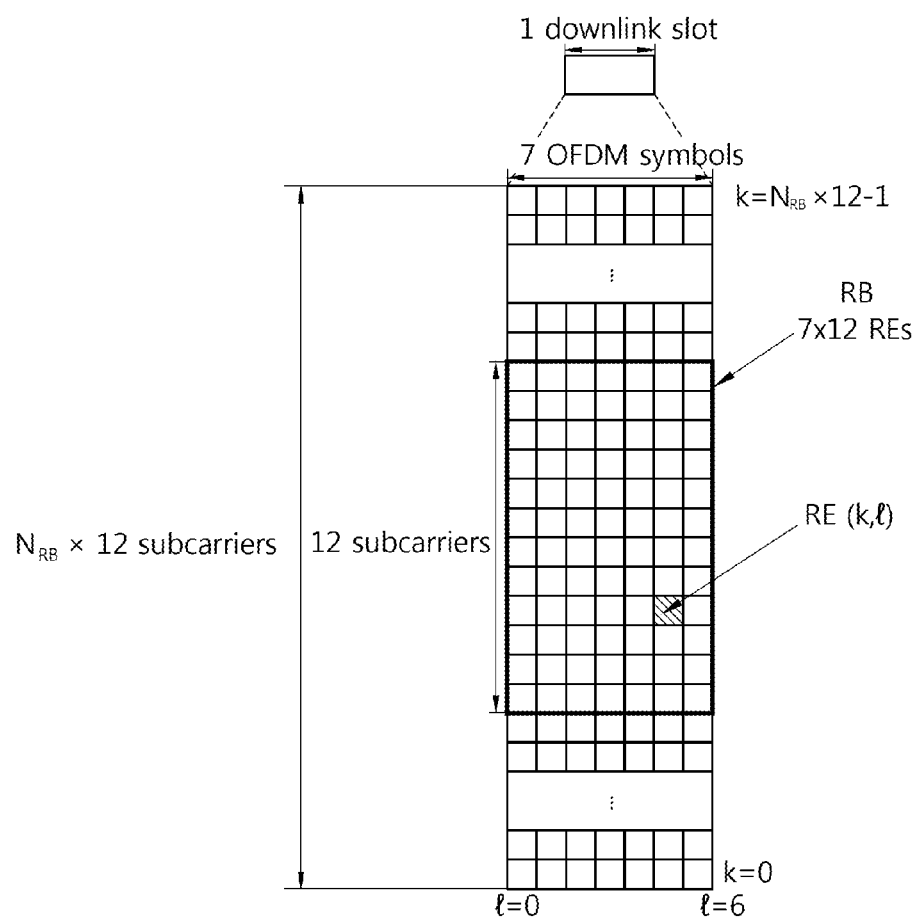
FIG. 2 illustrates an example of the resource grid of a single downlink slot.

FIG. 2 illustrates an example of the resource grid of a single downlink slot.

A downlink slot includes a plurality of OFDM symbols in a time domain and includes an $N_{RB}$ number of RBs in a frequency domain. The number of RBs $N_{RB}$ included in a downlink slot depends on a downlink transmission bandwidth configured in a cell. For example, in an LTE system, the number of RBs $N_{RB}$ may be any a single of 60 to 110. A single RB includes a plurality of subcarriers in a frequency domain. An uplink slot may have the same structure as the downlink slot.

Each element on the resource grid is referred to as a Resource Element (RE). The RE on the resource grid may be identified by an index pair (k,l) within a slot. In this case, k (k=0, ..., $N_{RB}$×12−1) is a subcarrier index in a frequency domain, and l (l=0, ..., 6) is an OFDM symbol index in a time domain.

In this case, a single RB is illustrated as including 7×12 REs, including 7 OFDM symbols in a time domain and 12 subcarriers in a frequency domain, but the number of OFDM symbols and the number of subcarriers within an RB are not limited thereto. The number of OFDM symbols and the number of subcarriers may be changed in various ways depending on the length of a CP, frequency spacing, etc.

Figure 3:
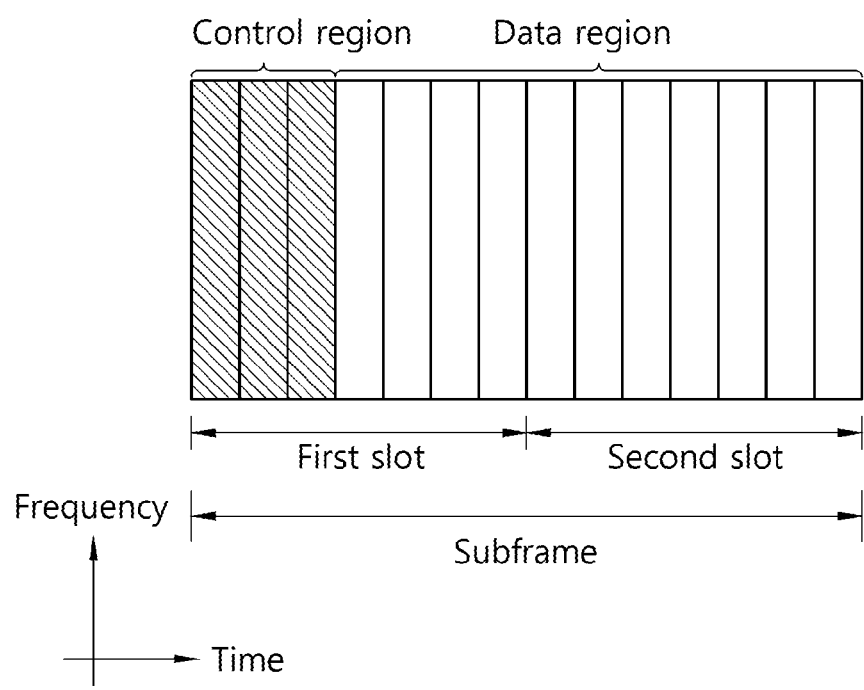
FIG. 3 illustrates the structure of a downlink subframe.

FIG. 3 illustrates the configuration of a downlink subframe.

A downlink (DL) subframe is divided into a control region and a data region in a time domain. The control region includes a maximum of former 3 OFDM symbols in a first slot within the DL subframe, but the number of OFDM symbols included in the control region may be changed. Control channels different from a physical downlink control channel (PDCCH) are allocated to the control region, and PDSCHs are allocated to the data region.

As disclosed in 3GPP TS 36.211 V8.7.0 of 3GPP LTE/LTE-A, a physical channel can be classified into a data channel and a control channel. The data channel may include a PDSCH and a physical uplink shared channel (PUSCH). The control channel may include a PDCCH, a physical control format indicator channel (PCFICH), a physical hybrid-ARQ indicator channel (PHICH) and a physical uplink control channel (PUCCH).

A PCFICH transmitted in the first OFDM symbol of a subframe carries a Control Format Indicator (CIF) indicative of the number of OFDM symbols (i.e., the size of a control region) used to transmit control channels within the subframe. UE may receive a CIF on a PCFICH and then monitor a PDCCH. The PCFICH is transmitted through the fixed PCFICH resources of the subframe without using blind decoding.

A PHICH carries positive-acknowledgement (ACK)/negative-acknowledgement (NACK) signals for a uplink Hybrid Automatic Repeat Request (HARQ). The ACK/NACK signal of UL data on a PUSCH transmitted by UE is transmitted through a PHICH.

A physical broadcast channel (PBCH) is transmitted in first 4 OFDM symbols of a second slot of a first subframe in a radio frame. The PBCH can carry essential system information for the UE to communicate with a BS. The system information on the PBCH may be referred as master information block (MIB). System information on PDSCH indicated by a PDCCH may be referred as system information block (SIB).

A PDCCH occupies a maximum of four OFDM symbols in the time domain and is transmitted over the entire system band in the frequency domain. Control information transmitted through a PDCCH is called Downlink Control Information (DCI). DCI may include information about the resource allocation of a PDSCH (this is also called a DL grant), the resource allocation of a PUSCH (this is also called an UL grant), a set of transmit power control commands for each UE within a specific UE group, and/or the activation of a Voice over Internet Protocol (VoIP).

In 3GPP LTE, a blind decoding us used for PDCCH detection. In blind decoding, a UE damasks an identifier with a Cyclic Redundancy Check (CRC) of a received PDCCH (i.e. a candidate PDCCH) and checks CRC error to confirm that the received PDCCH is destined to the UE.

A BS determines a PDCCH format based on DCI to be transmitted to UE, attaches a CRC to the DCI, and masks a unique identifier (this is also called a Radio Network Temporary Identifier (RNTI)) the CRC depending on the owner or use of a PDCCH.

A control region within a subframe includes a plurality of Control Channel Elements (CCEs). The CCE is a logical allocation unit used to provide a PDCCH with a coding rate depending on the state of a radio channel, and the CCE corresponds to a plurality of Resource Element Groups (REGs). The REG includes a plurality of REs. The format of a PDCCH and the number of bits of an available PDCCH are determined depending on association between the number of CCEs and a coding rate provided by the CCEs.

A single REG includes 4 Res, and a single CCE includes 9 REGs. In order to configure a single PDCCH, {1, 2, 4, 8} CCEs may be used. Each of the elements of {1, 2, 4, 8} is called a CCE aggregation level.

The number of CCEs used to send a PDDCH is determined by a BS depending on a channel state. For example, UE having a good DL channel state may use a single CCE to send a PDCCH. UE having a poor DL channel state may use 8 CCEs to send a PDCCH.

A control channel including one or more CCEs is mapped to physical resources, after interleaving is performed in unit of an REG and cyclic shift based on a cell identifier (ID) is then performed.

Figure 4:
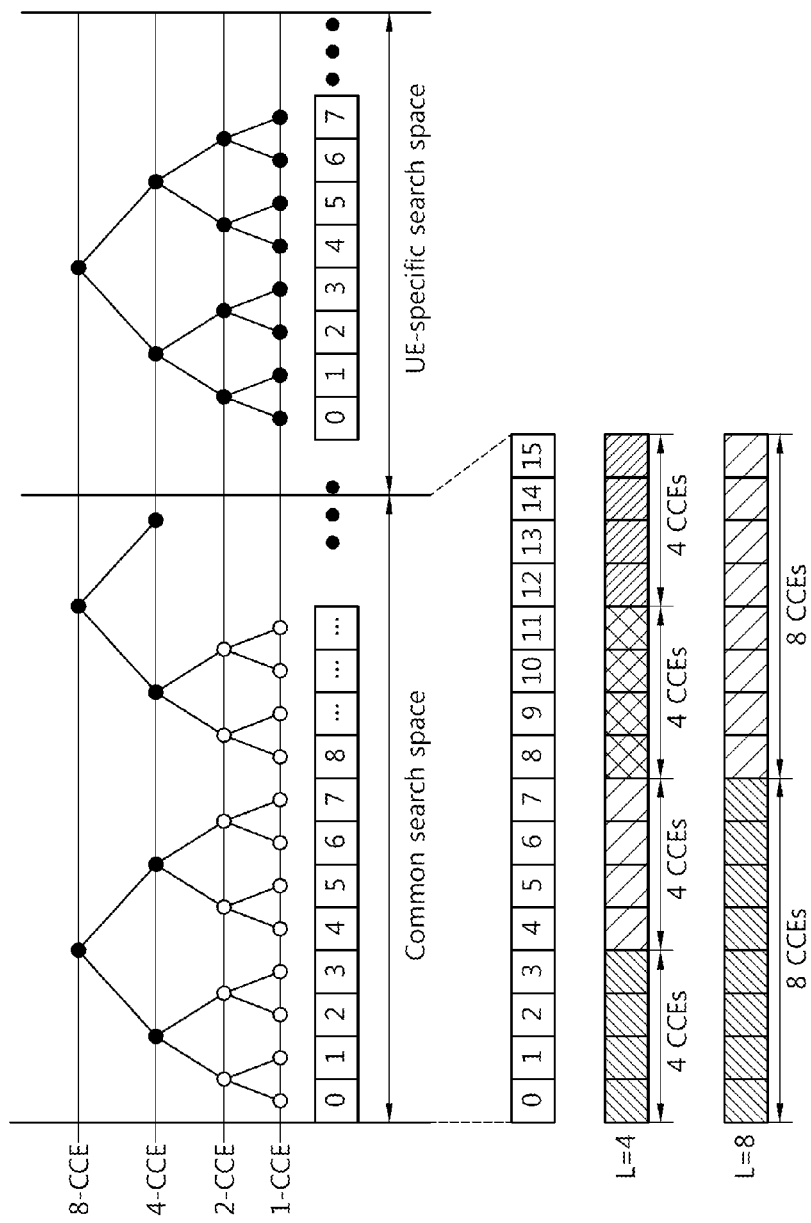
FIG. 4 is an exemplary diagram illustrating the monitoring of a physical downlink control channel (PDCCH).

FIG. 4 is an exemplary diagram illustrating the monitoring of a PDCCH. For the monitoring of the PDCCH, reference may be made to section 9 of 3GPP TS 36.213 V10.4.0.

A UE is unable to know that its own PDCCH is transmitted using what CCE aggregation level or what DCI format in which place within a control region. Since a plurality of PDCCHs may be transmitted within a single subframe, UE monitors the plurality of PDCCHs for every subframe. In this case, the term 'monitoring' means that the UE attempts to decode the PDCCH depending on a PDCCH format.

In 3GPP LTE, in order to reduce a load resulting from blind decoding, a search space is used. The search space may be called a monitoring set of CCEs for a PDCCH. UE monitors a PDCCH within a search space.

A search space is divided into a common search space and a UE-specific search space. The common search space is a space where a PDCCH having common control information is searched for. The common search space includes 16 CCEs having a CCE index 0 to a CCE index 15 and supports a PDCCH having a {4, 8} CCE aggregation level. However, a PDCCH (DCI formats 0 and 1A) that carries UE-specific information may also be transmitted in the common search space. The UE-specific search space supports a PDCCH having a {1, 2, 4, 8} CCE aggregation level.

Table 2 below indicates the number of PDCCH candidates monitored by UE.

TABLE 2

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

The size of a search space is defined in Table 2, and the start point of the search space is differently defined in a common search space and a UE-specific search space. A start point of the common search space is fixed irrespective of a subframe, whereas a start point of the UE-specific search space may be different in each subframe depending on a UE identifier (e.g., C-RNTI), a CCE aggregation level and/or a slot number within a radio frame. If the start point of a UE-specific search space is within a common search space, the UE-specific search space and the common search space may overlap with each other.

In an aggregation level L∈{1,2,4,8}, a search space $S_k^{(L)}$ is defined as a set of PDCCH candidates. A CCE corresponding to the PDCCH candidates m of the search space $S_k^{(L)}$ is given as follows.

$$L \cdot \{(Y_k + m') \mod \lfloor N_{CCE,k}/L \rfloor \} + i \quad \text{[Equation 1]}$$

In Equation 1, i=0, 1, ..., L−1, m=0, ..., $M^{(L)}$−1, and $N_{CCE,k}$ is a total number of CCEs that may be used to send a PDCCH within a control region of a subframe k. The control region includes a set of CCEs numbered from 0 to $N_{CCE,k}$−1. $M^{(L)}$ is the number of PDCCH candidates in a CCE aggregation level L in a given search space.

If a Carrier Indicator Field (CIF) is set in UE, m'=m+$M^{(L)}$ $n_{cif}$. $n_{cif}$ is a value of the CIF. F a CIF is not set in UE, m'=m.

In a common search space, $Y_k$ is set to 2 aggregation levels and is set to 0 in relation to L=4 and L=8.

In a UE-specific search space having an aggregation level L, a parameter $Y_k$ is defined as follows.

$$Y_k = (A \cdot Y_{k-1}) \mod D \quad \text{[Equation 2]}$$

In Equation 2, $Y_{-1} = n_{RNTI} \neq 0$, A=39827, D=65537, k=floor ($n_s/2$), and $n_s$ is a slot number within a radio frame.

When UE monitors a PDCCH based on a C-RNTI, a DCI format and a search space to be monitored are determined depending on transmission mode of a PDSCH. The following table shows an example of the monitoring of a PDCCH in which a C-RNTI is set.

TABLE 2

| TRANSMISSION MODE | DCI FORMAT | SEARCH SPACE | TRANSMISSION MODE OF PDSCH ACCORDING TO PDCCH |
|---|---|---|---|
| Mode 1 | DCI format 1A | common and UE-specific | Single antenna port, port 0 |
| | DCI format 1 | UE-specific | Single antenna port, port 0 |
| Mode 2 | DCI format 1A | common and UE-specific | Transmit diversity |
| | DCI format 1 | UE-specific | Transmit diversity |
| Mode 3 | DCI format 1A | common and UE-specific | Transmit diversity |
| | DCI format 2A | UE-specific | Cyclic Delay Diversity (CDD) or transmit diversity |
| Mode 4 | DCI format 1A | common and UE-specific | Transmit diversity |
| | DCI format 2 | UE-specific | Closed-loop spatial multiplexing |
| Mode 5 | DCI format 1A | common and UE-specific | Transmit diversity |
| | DCI format 1D | UE-specific | Multi-user Multiple Input Multiple Output (MU-MIMO) |
| Mode 6 | DCI format 1A | common and UE-specific | Transmit diversity |
| | DCI format 1B | UE-specific | Closed-loop spatial multiplexing |
| Mode 7 | DCI format 1A | common and UE-specific | If the number of PBCH transmission ports is 1, single antenna port, port 0, and if not, transmit diversity |
| | DCI format 1 | UE-specific | a single antenna port, port 5 |
| Mode 8 | DCI format 1A | common and UE-specific | If the number of PBCH transmission ports is 1, single antenna port, port 0, and if not, transmit diversity |
| | DCI format 2B | UE-specific | Dual layer transmission (port 7 or 8), or a single antenna port, port 7 or 8 |
| Mode 9 | DCI format 1A | common and UE-specific | Non-MBSFN subframe: If the number of PBCH antenna ports is one, Single-antenna port, port 0 is used, otherwise Transmit diversity. MBSFN subframe: Single-antenna port, port 7 |
| | DCI format 2C | UE-specific | Up to 8 layer transmission, ports 7-14 |

Figure 5:
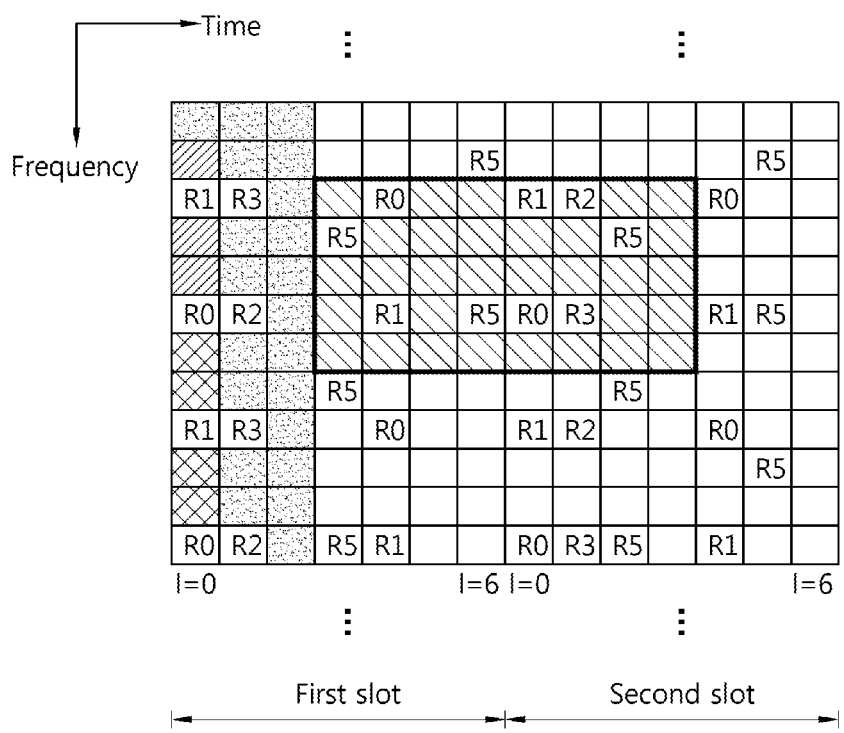
FIG. 5 illustrates an example in which reference signals and control channels are disposed in a downlink (DL) subframe of 3GPP LTE.

FIG. 5 illustrates an example in which reference signals (RSs) and control channels are disposed in a downlink subframe of 3GPP LTE.

A control region includes first 3 OFDM symbols, and a data region in which a PDSCH is transmitted includes the remaining OFDM symbols.

A Physical Control Format Indicator Channel (PCFICH), a Physical Hybrid-ARQ Indicator Channel (PHICH) and/or a PDCCH are transmitted in the control region. The CFI of the PCFICH indicates the 3 OFDM symbols. A region of the control region other than resources through which the PCFICH and/or the PHICH are transmitted becomes a PDCCH region in which a PDCCH is monitored.

Furthermore, various types of reference signals are also transmitted in the DL subframe.

A Cell-specific Reference Signal (CRS) may be received by all pieces of UEs within a cell and is transmitted over the entire DL band. In FIG. 5, 'R0' is a Resource Element (RE) in which the CRS of a first antenna port is transmitted, 'R1' is an RE in which the CRS of a second antenna port is transmitted, 'R2' is an RE in which the CRS of a third antenna port is transmitted, and 'R3' is an RE in which the CRS of a fourth antenna port is transmitted.

An RS sequence $r_{l,ns}(m)$ for a CRS is defined as follows.

$$r_{l,ns}(m) = \frac{1}{\sqrt{2}}(1 - 2 \cdot c(2m)) + j\frac{1}{\sqrt{2}}(1 - 2 \cdot c(2m+1))$$ [Equation 3]

In Equation 3, m=0, 1, . . . , $2N_{maxRB}-1$, $N_{maxRB}$ is a maximum number of RBs, ns is a slot number within a radio frame, and l is an OFDM symbol number within a slot.

A pseudo-random sequence c(i) is defined by the following gold sequence having a length of 31.

$c(n)=(x_1(n+Nc)+x_2(n+Nc))\mod 2$ $x_1(n+31)=(x_1(n+3)+x_1(n))\mod 2$ $x_2(n+31)=(x_2(n+3)+x_2(n+2)+x_2(n+1)+x_2(n))\mod 2$ [Equation 4]

In Equation 4, Nc=1600, and a first m-sequence is initialized to $x_1(0)=1$, $x_1(n)=0$, $m=1, 2, \ldots, 30$.

A second m-sequence is initialized to $c_{init}=2^{10}(7(ns+1)+l+1)(2N^{cell}_{ID}+1)+2N^{cell}_{ID}+N_{CP}$ at the start of each OFDM symbol. $N^{cell}_{ID}$ is the Physical Cell Identity (PCI) of a cell. $N_{CP}=1$ in a normal CP, and $N_{CP}=0$ in an extended CP.

Furthermore, a UE-specific Reference Signal (URS) may be transmitted. A CRS is transmitted in the entire region of a subframe, whereas an URS is transmitted within the data region of a subframe and used to demodulate a PDSCH. In FIG. 5, 'R5' indicates an RE in which an URS is transmitted. The URS is also called a Dedicated Reference Signal (DRS) or a Demodulation Reference Signal (DM-RS).

The URS is transmitted only in an RB to which a corresponding PDSCH is mapped. In FIG. 5, although R5 is indicated in regions other than a region in which a PDSCH is transmitted, this is for indicating the location of an RE to which an URS is mapped.

The URS is used by only UE that receives a corresponding PDSCH. An RS sequence $r_{ns}(m)$ for US is given in Equation 3. In this case, m=0, 1, . . . , $12N_{PDSCH,RB}-1$, and $N_{PDSCH,RB}$ is the number of RBs used to send a corresponding PDSCH. A pseudo-random sequence generator is initialized to $c_{init}=$(floor(ns/2)+1)$(2N^{cell}_{ID}+1)2^{16}+n_{RNTI}$ at the start of each subframe. $n_{RNTI}$ is the identifier of UE.

An URS may be transmitted through a single antenna, but may be transmitted through multiple antennas. If an URS is transmitted through multiple antennas, a pseudo-random sequence generator is initialized to $c_{init}=$(floor(ns/2)+1)$(2N^{cell}_{ID}+1)2^{16}+n_{SCID}$ at the start of each subframe. $n_{SCID}$ is a parameter obtained from a DL grant (e.g., DCI format 2B or 2C) related to PDSCH transmission.

Meanwhile, a PDCCH is monitored in a limited region called a control region within a subframe, and a CRS transmitted in all bands is used in a PDCCH in order to demodulate the PDCCH. As the type of control information is diversified and the amount of control information is increased, the flexibility of scheduling using only an existing PDCCH is low. Furthermore, in order to reduce a load due to CRS transmission, an enhanced physical downlink control channel (ePDCCH) is being introduced.

Figure 6:
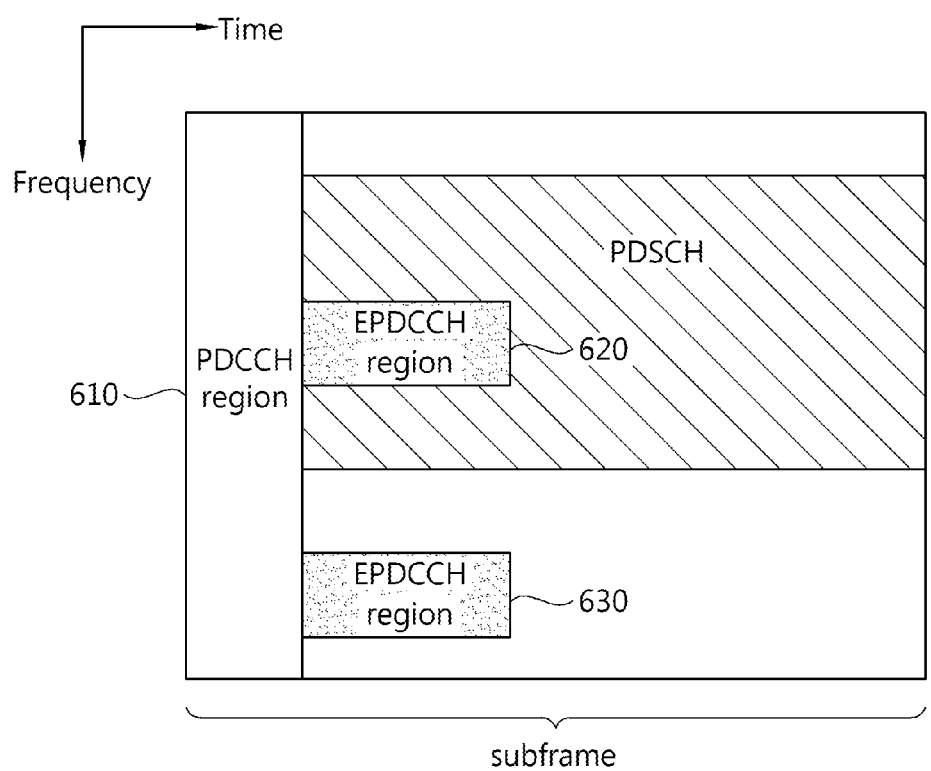
FIG. 6 is an example of a subframe having an enhanced PDCCH (EPDCCH).

FIG. 6 is an example of a subframe having an enhanced PDCCH (ePDCCH).

The subframe may include 0 or a single PDCCH region 610 and 0 or more ePDCCH regions 620 and 630.

UE monitors an ePDCCH in the ePDCCH regions 620 and 630. The PDCCH region 610 is located within former 4 OFDM symbols within a subframe, whereas the ePDCCH regions 620 and 630 may be flexibly scheduled in OFDM symbols after the PDCCH region 610.

One or more ePDCCH regions 620 and 630 may be assigned to UE, and the UE may monitor an ePDCCH in the assigned ePDCCH regions 620 and 630.

A BS may inform UE of information about the number/location/size of the ePDCCH regions 620 and 630 and/or a subframe in which an ePDCCH will be monitored through an RRC message.

In the PDCCH region 610, a PDCCH may be demodulated based on a CRS. In the ePDCCH regions 620 and 630, a demodulation (DM) RS not a CRS may be defined in order to demodulate an ePDCCH. A corresponding DM RS may be transmitted in corresponding ePDCCH regions 620 and 630.

An RS sequence $r_{ns}(m)$ for a DM RS is the same as Equation 3. In this case, m=0, 1, . . . , $12N_{RB}-1$, and $N_{RB}$ is a maximum number of RBs. A pseudo-random sequence generator may be initialized to $c_{init}=$(floor(ns/2)+1)$(2N_{ePDCCH,ID}+1)2^{16}+n_{ePDCCH,SCID}$ at the start of each subframe. ns is a slot number within a radio frame, $N_{ePDCCH,ID}$ is a cell index related to a corresponding ePDCCH region, and $n_{ePDCCH,SCID}$ is a parameter given from higher layer signaling.

Each of the ePDCCH regions 620 and 630 may be used in scheduling for a different cell. For example, an ePDCCH within the ePDCCH region 620 may carry scheduling information for a first cell, and an ePDCCH within the ePDCCH region 630 may carry scheduling information for a second cell.

When an ePDCCH is transmitted through multiple antennas in the ePDCCH regions 620 and 630, the same precoding as that of an ePDCCH may be applied to DM RSs within the ePDCCH regions 620 and 630.

If a PDCCH uses a CCE as a transmission resource unit, a transmission resource unit for an ePDCCH is called an enhanced Control Channel Element (eCCE). An aggregation level may be defined as a resource unit for monitoring an ePDCCH. For example, assuming that 1 eCCE is a minimum resource for an ePDCCH, an aggregation level L={1, 2, 4, 8, 16} may be defined.

Hereinafter, an ePDCCH search space may correspond to an ePDCCH region. One or more ePDCCH candidates may be monitored in the ePDCCH search space every one or more aggregation levels.

Resource allocation for an ePDCCH is described below.

An ePDCCH is transmitted using one or more eCCEs. An eCCE includes a plurality of enhanced Resource Element Groups (eREGs). An eCCE may include 4 eREGs or 8 eREGs depending on the type and CP of a subframe. For example, an eCCE may include 4 eREGs in a normal CP, and an eCCE may include 8 eREGs in an extended CP.

A Physical Resource Block (PRB) pair refers to two PRBs having the same RB number in a single subframe. That is, a PRB pair refers to the first PRB of a first slot and the second PRB of a second slot in the same frequency domain. In a normal CP, a PRB pair includes 14 OFDM symbols and 12 subcarriers.

Figure 7:
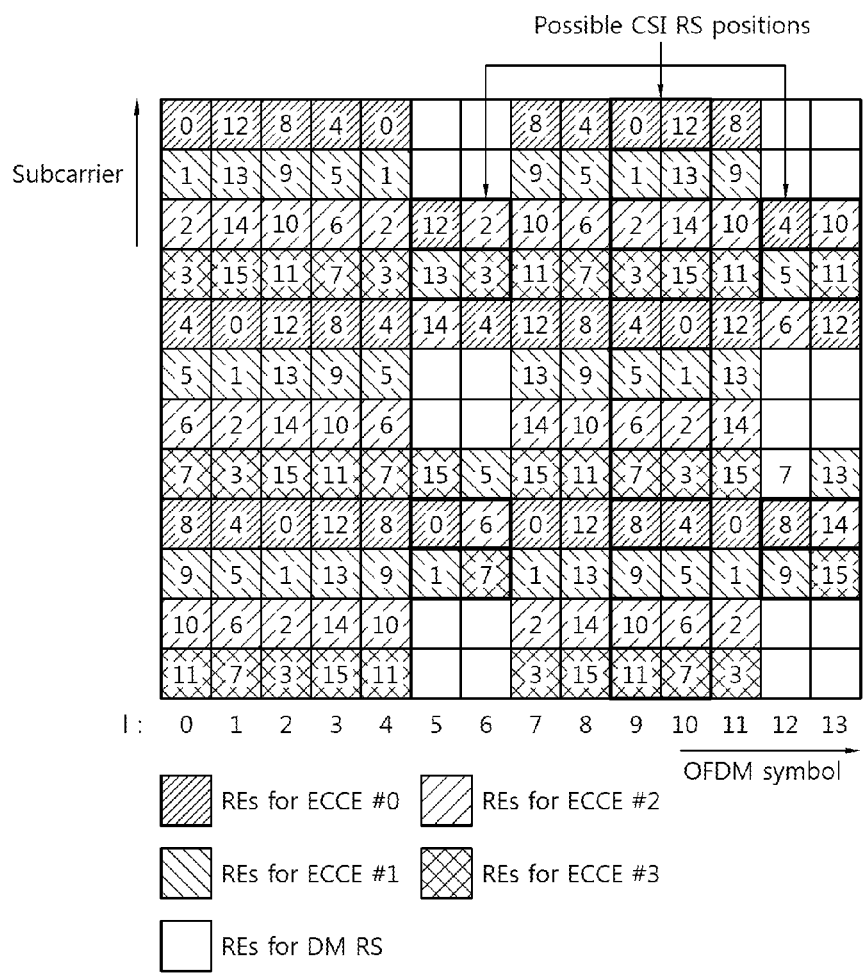
FIG. 7 illustrates an example of a Physical Resource Block (PRB) pair.

FIG. 7 illustrates an example of a Physical Resource Block (PRB) pair. Each PRB is hereinafter assumed to include 7 OFDM symbols and 12 subcarriers, but the number of OFDM symbols and the number of subcarriers are only exemplary.

In a single subframe, a PRB pair includes 168 REs. 16 eREGs are formed using 144 REs other than 24 REs for DM-RSs. That is, a single eREG may include 9 REs. In this case, a CSI-RS or a CRS may be disposed in a single PRB pair in addition to the DM-RSs. In such a case, since the number of available REs is reduced, the number of REs included in a single eREG may also be reduced. The number of REs included in an eREG may be changed, but the number of eREGs included in a single PRB pair is not changed.

As illustrated in FIG. 7, RE indices may be sequentially assigned from the first subcarrier of a first OFDM symbols (l=0). It is assumed that indices of 0 to 15 are assigned to 16 eREGs. In this case, 9 REs having the RE index 0 is allocated to the eREG 0. Likewise, 9 REs corresponding to an RE index k (k=0, ..., 15) are allocated to an eREG k.

An eREG is defined by grouping a plurality of eREGs. For example, if an eREG having 4 eREGs is defined, an eREG #0={an eREG 0, an eREG 4, an eREG 8, an eREG 12}, an eREG #1={an eREG 1, an eREG 5, an eREG 9, an eREG 3}, an eREG #2={an eREG 2, an eREG 6, an eREG 10, an eREG 14}, and an eREG #3={an eREG 3, an eREG 7, an eREG 11, an eREG 15} may be defined. If an eREG having 8 eREGs is defined, an eREG #0={an eREG 0, an eREG 2, an eREG 4, an eREG 6, an eREG 8, an eREG 10, an eREG 12, an eREG 14}, and an eREG #1={an eREG 1, an eREG 3, an eREG 5, an eREG 7, an eREG 9, an eREG 11, an eREG 13, an eREG 15} may be defined.

As described above, an eCCE may include 4 eREGs in a normal CP, and an eCCE may include 8 eREGs in an extended CP. The eCCE is defined by an eREG. For example, FIG. 7 illustrates that an eCCE #0 includes an eREG #0, an eCCE #1 includes an eREG #1, an eCCE #2 includes an eREG #2, and an eCCE #3 includes an eREG #3.

eCCE-to-eREG mapping includes two types: localized transmission and distributed transmission. In the localized transmission, an eREG that forms a single eCCE is selected from an eREG within a single PRB pair. In the distributed transmission, an eREG that forms a single eCCE is selected from an eREG from different PRB pairs.

Figure 8:
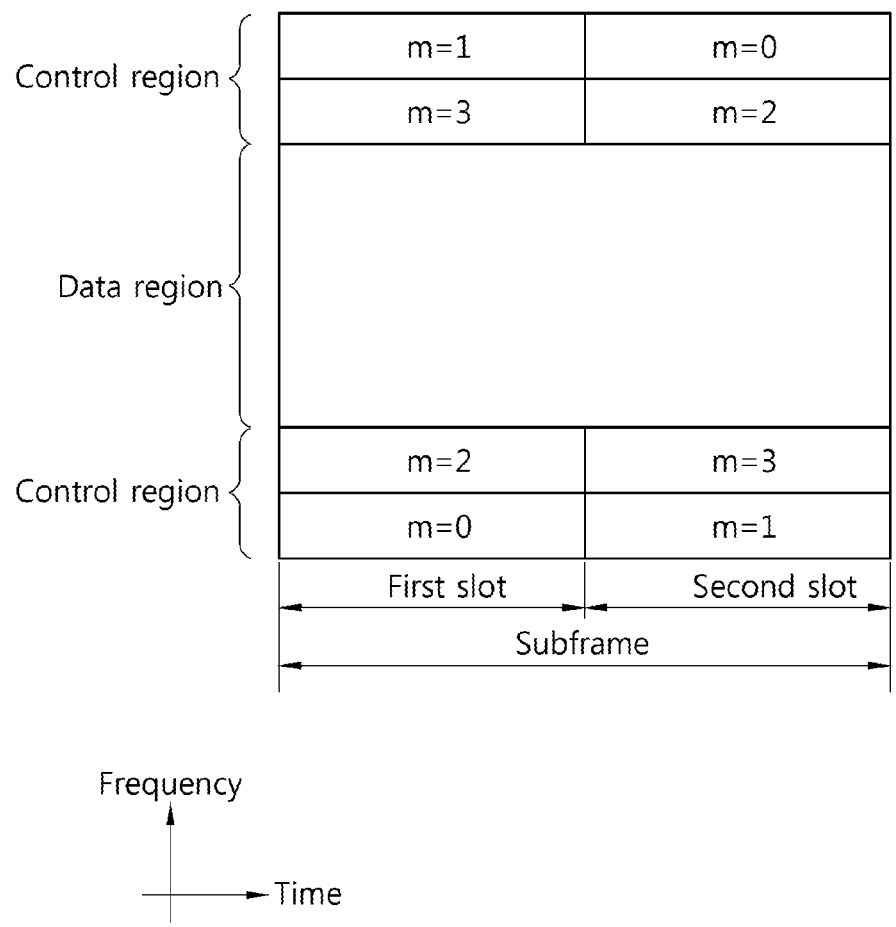
FIG. 8 illustrates the structure of an uplink subframe.

FIG. 8 illustrates the structure of an uplink subframe.

A uplink subframe may be divided into a control region and a data region in a frequency domain. Physical uplink control channels (PUCCHs) on which uplink control information is transmitted are allocated to the control region. Physical uplink shared channels (PUSCHs) on which data is transmitted are allocated to the data region.

A PUCCH for a single piece of UE is allocated in the form of a single PRB pair in an subframe. RBs belonging to a single PRB pair occupy different subcarriers in a first slot and a second slot. A frequency occupied by RBs that belong to an RB pair allocated to a PUCCH is changed based on a slot boundary. This is said that a PRB pair allocated to a PUCCH has been frequency-hopped at the slot boundary. UE may obtain a frequency diversity gain by sending uplink control information through different subcarriers over time. m is a location index indicative of the logical frequency domain location of an RB pair allocated to a PUCCH in a subframe.

Uplink control information transmitted on a PUCCH includes Hybrid Automatic Repeat Request (HARQ) acknowledgement (ACK), a Channel Quality Indicator indicative of a DL channel state, and a Scheduling Request that is an uplink radio resource allocation request.

Meanwhile, a demand for a high data transfer rate is increased, and thus a Carrier Aggregation (CA) supporting a plurality of cells may be applied in 3GPP LTE-A. A CA may also be called another term, such as a bandwidth aggregation. A CA means that a wireless communication system forms a broadband by collecting one or more carriers each having a bandwidth smaller than a broadband, that is, a target, when trying to support the broadband. Carriers, that is, a target, when one or more carriers are collected, may use bandwidths used in an existing system for the purpose of backward compatibility with the existing system. For example, in 3GPP LTE, bandwidths, such as 1.4 MHz, 3 MHz, 5 MHz, 10 MHz, 15 MHz, and 20 MHz, may be supported. In 3GPP LTE-A, a broadband of 20 MHz or higher may be configured using only the bandwidths of a 3GPP LTE system. Alternatively, new bandwidths may be defined without using the bandwidths of existing systems, and a broadband may be configured using the new bandwidths.

A plurality of BSs and a plurality of pieces of UE may communicate with each other through a maximum of 5 cells. The 5 cells may correspond to a bandwidth of a maximum of 100 MHz. That is, a CA environment indicates that specific UE has two or more configured serving cells (hereinafter called cells) having different carrier frequencies. The carrier frequency indicates the center frequency of a cell.

A cell indicates a combination of DL resources and UL resources optionally. That is, a cell must include DL resources and may optionally include UL resources combined with the DL resources. The DL resource may be a DL Component Carrier (CC). The UL resource may be an UL CC. If specific UE has a single configured serving cell, it may have a single DL CC and a single UL CC. If specific UE has two or more cells, it may have DL CCs equal to the number of cells and UL CCs smaller than or equal to the number of cells. That is, if a CA is supported in current 3GPP LTE-A, the number of DL CCs may be always greater than or equal to the number of UL CCs. In contrast, releases subsequent to 3GPP LTE-A, a CA in which the number of DL CCs is smaller than the number of UL CCs may be supported.

Linkage between the carrier frequency of a DL CC and the carrier frequency of an UL CC may be indicated by system information transmitted on a DL CC. The system information may be System Information Block type2 (SIB2).

Figure 9:
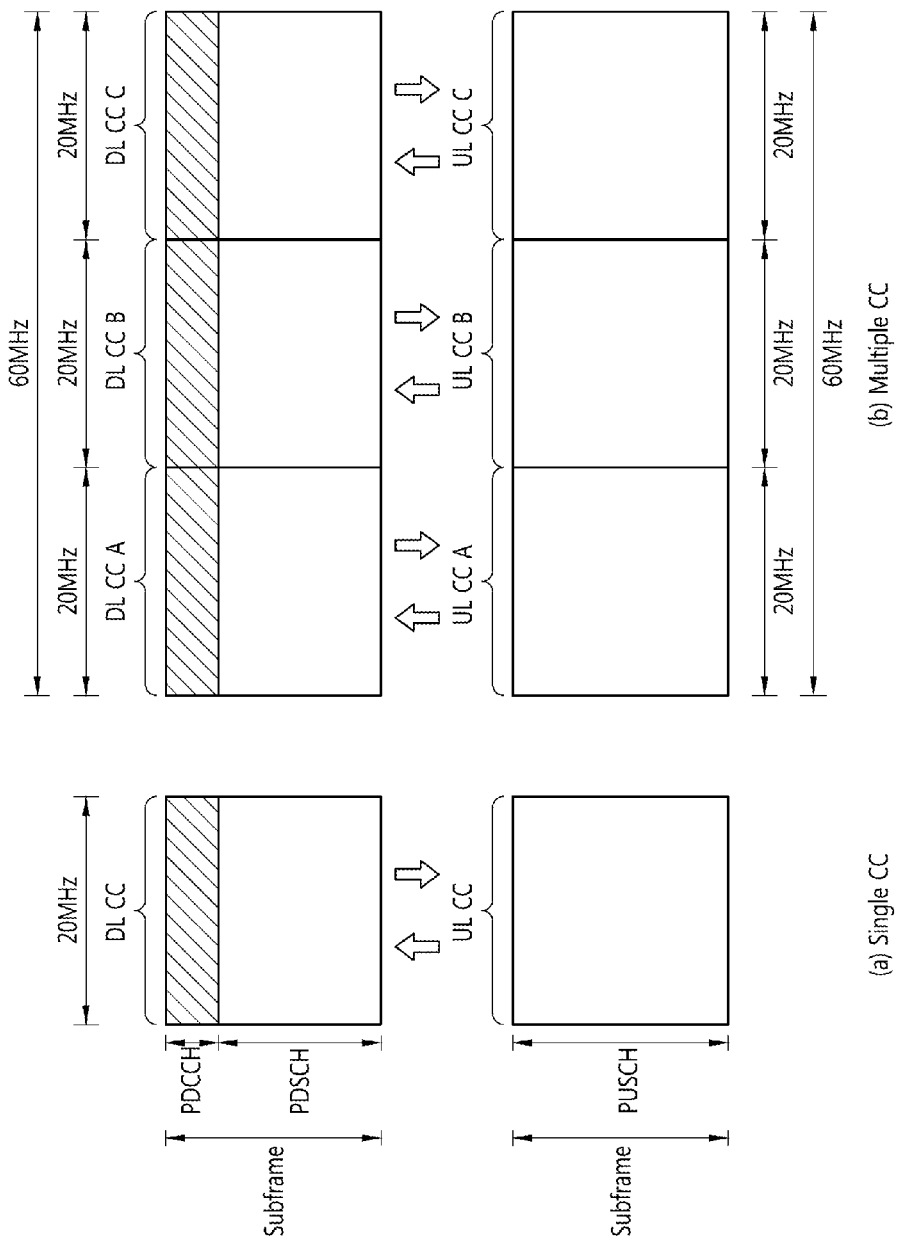
FIG. 9 illustrates examples of the subframe structures of a single carrier system and a carrier aggregation system.

FIG. 9 illustrates an example of the structure of the subframes of a single carrier system and a carrier aggregation system.

FIG. 9-(a) illustrates a single carrier system. A system bandwidth of FIG. 9-(a) is assumed to be 20 MHz. Since the number of carriers is 1, each of the bandwidth of a DL CC transmitted by a BS and the bandwidth of an UL CC transmitted by UE is 20 MHz. The BS performs DL transmission through the DL CC, and the UE performs UL transmission through the UL CC.

FIG. 9-(b) illustrates a carrier aggregation system. A system bandwidth of FIG. 9-(b) is assumed to be 60 MHz. A downlink bandwidth includes a DL CC A, a DL CC B, and a DL CC C each having a bandwidth of 20 MHz. An uplink bandwidth includes an UL CC A, an UL CC B, and an UL CC C each having a bandwidth of 20 MHz. A BS performs DL transmission through the DL CC A, the DL CC B, and the DL CC C, and UE performs UL transmission through the UL CC A, the UL CC B, and the UL CC C. The DL CC A and the UL CC A, the DL CC B and the UL CC B, and the DL CC C and the UL CC C may correspond to each other.

UE may monitor and/or receive a DL signal and/or data, transmitted through a plurality of DL CCs, at the same time. Although a cell manages N DL CCs, a BS may configure M DL CCs in cell-specific or UE-specific way so that UE monitors only a DL signal and/or data transmitted through the M DL CCs less than the N DL CCs. Furthermore, a BS may configure L DL CCs in a cell-specific way or UE-specific way so that UE preferentially monitors a DL signal and/or data, transmitted through the L DL CCs of M DL CCs.

UE supporting a CA may use a Primary cell (PCell) and one or more Secondary cells (SCell) for an increased bandwidth. That is, if two or more cells are present, a single cell becomes a PCell, and the remaining cells become SCells. Both the PCell and the SCell may become serving cells. UE in the RRC_CONNECTED state which does not support or cannot support a CA may have only a single serving cell including a PCell. UE in the RRC_CONNECTED state which supports a CA may have one or more serving cells including a PCell and all SCells.

A PCell may be a cell that operates in a primary frequency. A PCell may be a cell on which UE performs Radio Resource Control (RRC) connection with a network. A PCell may be a cell having the smallest cell index. A PCell may be a cell on which UE first attempts random access through a Physical Random Access Channel (PRACH), of a plurality of cells. A PCell may be a cell on which UE performs an initial connection establishment process or a connection re-establishment process in a CA environment. Alternatively, a PCell may be a cell indicated in a handover process. UE may obtain Non-Access Stratum (NAS) mobility information (e.g., a Tracking Area Indicator (TAI)) when performing RRC connection/reconfiguration/handover through a PCell. Furthermore, UE may obtain security input when performing RRC reconfiguration/handover through a PCell. UE may receive and send a PUCCH assigned thereto only in a PCell. Furthermore, UE may apply system information acquisition and system information change monitoring to only a PCell. A network may change the PCell of UE which supports a CA in a handover process using an RRCConnectionReconfiguration message including MobilityControlInfo.

An SCell may be a cell that operates in a secondary frequency. An SCell is used to provide additional radio resources. A PUCCH is not allocated to an SCell. When adding SCells, a network provides system information about a corresponding cell to UE in the RRC_CONNECTED state through dedicated signaling. A change of system information with respect to an SCell may be performed by the release and addition of a cell. A network may add, remove, or modify an SCell independently through an RRC connection re-establishment process using an RRCConnectionReconfiguration message.

LTE-A UE supporting a CA may send or receive one CC or a plurality of CCs at the same time depending on its capacity. LTE rel-8 UE may send or receive only a single CC when each of CCs forming a CA is compatible with an LTE rel-8 system. Accordingly, if the number of CCs used in uplink is at least the same as the number of CCs used in downlink, all the CCs need to be configured to be compatible with LTE rel-8. Furthermore, in order to efficiently use a plurality of CCs, the plurality of CCs may be managed in Media Access Control (MAC). If a CA is configured in DL, a receiver within UE needs to be able to receive a plurality of DL CCs. If a CA is configured in UL, a transmitter within UE needs to be able to send a plurality of UL CCs.

As a CA environment is introduced, cross-carrier scheduling may be applied. A PDCCH on a specific DL CC may schedule a PDSCH on any one of a plurality of DL CCs or schedule a PUSCH on any one of a plurality of UL CCs through cross-carrier scheduling. For cross-carrier scheduling, a Carrier Indicator Field (CIF) may be defined. A CIF may be included in a DCI format transmitted on a PDCCH. Whether or not the CIF is present in the DCI format may be indicated by an upper layer semi-statically or in a UE-specific way. When cross-carrier scheduling is performed, a CIF may indicate a DL CC on which a PDSCH is scheduled or an UL CC on which a PUSCH is scheduled. The CIF may have fixed 3 bits and may be present at a fixed location irrespective of the size of a DCI format. If a CIF is not present in a DCI format, a PDCCH on a specific DL CC may schedule PDSCHs on the same DL CC or schedule a PUSCH on an UL CC connected to the specific DL CC through SIB2.

If cross-carrier scheduling is performed using a CIF, a BS may assign a PDCCH monitoring DL CC aggregation in order to reduce the complexity of blind decoding by UE. The PDCCH monitoring DL CC aggregation is some of all DL CCs, and UE performs blind decoding on only PDCCHs within the PDCCH monitoring DL CC aggregation. That is, in order to schedule a PDSCH and/or a PUSCH in relation to the UE, a BS may send a PDCCH through only a DL CC within the PDCCH monitoring DL CC aggregation. The PDCCH monitoring DL CC aggregation may be configured in a UE-specific way, a UE group-specific way, or a cell-specific way.

Figure 10:
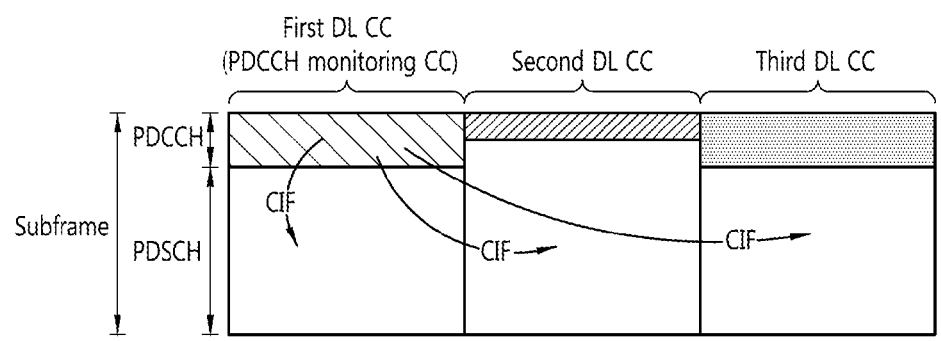
FIG. 10 illustrates an example of the subframe structure of a 3GPP LTE-advanced (A) system that is subjected to cross-carrier scheduling through a carrier indicator field.

FIG. 10 illustrates an example of the subframe structure of a 3GPP LTE-advanced (A) system that is subjected to cross-carrier scheduling through a carrier indicator field.

Referring to FIG. 10, the first DL CC of 3 DL CCs is configured as a PDCCH monitoring DL CC. If cross-carrier scheduling is not performed, each of the DL CCs schedules a PDSCH in order to send each PDCCH. If cross-carrier scheduling is performed, only the first DL CC configured as the PDCCH monitoring DL CC sends the PDCCH. The PDCCH transmitted on the first DL CC schedules the PDSCHs of a second DL CC and a third DL CC using a CIF in addition to the PDSCH of the first DL CC. The second DL CC and the third DL CC not configured as the PDCCH monitoring DL CC do not send a PDCCH.

Meanwhile, cross-carrier scheduling is not supported for a PCell. That is, a PCell is always scheduled by its own PDCCH. The UL grant and DL assignment of a cell are always scheduled by the same cell. That is, if DL is scheduled on a second carrier in a cell, UL is also scheduled on a second carrier. A PDCCH order may be transmitted on only a PCell. Furthermore, in an aggregated cell, frame timing, Super Frame Number (SFN) timing, etc. may be aligned.

If an aggregation level on a PCell is 4 or 8, UE may monitor a single CSS. UE for which a CIF has not been set monitors a single USS if an aggregation level on an activated serving cell is any one of 1, 2, 4, and 8. UE for which a CIF has been set monitors one or more USSs if an aggregation level on one or more activated serving cells is any one of 1, 2, 4, and 8 as configured by an upper layer. The CSS and the USS may overlap with each other on the PCell.

UE in which a CIF associated with a PDCCH monitored in a serving cell has been set monitors a PDCCH which consists of a CIF in the USS of the serving cell and includes CRS scrambled by a C-RNTI. UE in which a CIF associated with a PDCCH monitored in a PCell has been set monitors a PDCCH which consists of a CIF in the USS of the PCell and includes CRC scrambled by an SPS C-RNTI. Furthermore, the UE may monitor the PDCCH by searching a CSS without a CIF. In relation to a serving cell in which a PDCCH is monitored, UE for which a CIF has not been set monitors a USS without a CIF for the PDCCH. UE for which a CIF has been set monitors a USS through a CIF for a PDCCH. If UE is configured to monitor a PDCCH in an SCell through a CIF in another serving cell, the UE may not monitor the PDCCH of the SCell.

Furthermore, UE may send uplink control information, such as Channel State Information (CSI) or an ACK/NACK signal received, detected, or measured from one or more DL CCs, to a BS through a predetermined single UL CC. The CSI may include a CQI, a PMI, an RI, etc. For example, if UE needs to send an ACK/NACK signal for data received from the DL CCs of a PCell and the DL CCs of an SCell, the UE may multiplex or bundle a plurality of ACK/NACK signals for the data received from each DL CC and send the plurality of ACK/NACK signals to a BS through the PUCCH of UL CCs of the PCell. In 3GPP LTE, if it is necessary to send an ACK/NACK signal for a DL CC, the following three cases are present.

1) An ACK/NACK signal for the transmission of a PDSCH indicated by a corresponding PDCCH in a subframe (n−k) may be transmitted in a subframe n. k∈K, and K is an M element aggregation $\{k_0, k_1, \ldots, k_{M-1}\}$ according to the subframe n and an UL/DL configuration. This corresponds to a case where an ACK/NACK signal for a common PDSCH is transmitted.

2) An ACK/NACK signal for the PDCCH of a subframe (n−k) indicative of the release of DL Semi-Persistent Scheduling (SPS) may be transmitted in a subframe n. k∈K, and K is an M element aggregation $\{k_0, k_1, \ldots, k_{M-1}\}$ according to the subframe n and an UL/DL configuration. An ACK/NACK signal for a PDCCH indicative of the activation of DL SPS is not transmitted.

3) An ACK/NACK signal for the transmission of a PDSCH not including a PDCCH corresponding to a subframe (n−k) may be transmitted in a subframe n. k∈K, and K is an M element aggregation $\{k_0, k_1, \ldots, k_{M-1}\}$ according to the subframe n and an UL/DL configuration. This corresponds to a case where an ACK/NACK signal for SPS is transmitted.

In the above description, K is called a bundling window. That is, the bundling window refers to one or more DL subframes corresponding to an ACK/NACK signal in a single UL subframe. A wireless communication system may be basically divided into a Frequency Division Duplex (FDD) method and a Time Division Duplex (TDD) method. In accordance with the FDD method, uplink transmission and downlink transmission are performed while occupying different frequency bands. In accordance with the TDD method, uplink transmission and downlink transmission are performed at different times while occupying the same frequency band. In the case of an FDD system, M=1 and K={k0}={4}. Table 5 illustrates an example of a set K in a TDD system.

TABLE 5

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Meanwhile, in LTE releases 8/9/10, reference signals and control channels are transmitted in all the DL subframes other than subframes for special purposes, such as a Multicast Broadcast Single Frequency Network (MBSFN). For example, a CRS is transmitted over the entire downlink band, and control channels, such as a PCFICH/PDCCH/PHICH, are transmitted in some former OFDM symbols of a DL subframe. A reference signal and a control channel guarantee backward compatibility for the access of existing UE and service provided to existing UE.

In the next-generation system, in order to more efficiently use radio resources, it is expected that a new type of a carrier in which some or all of reference signals and control channels are not transmitted will be introduced. Such a carrier type is called a New Carrier Type (NCT). It is expected that the next-generation system will solve an interference problem between a plurality of cells, improve the extensibility of carriers, and support a high quality characteristic, such as 8 Tx Multiple Input Multiple Output (MIMO) using the NCT.

In such an NCT, the transmission of a CRS transmitted at a fixed high density is omitted or significantly reduced. Instead, DL data is received based on a DM-RS that is transmitted in a UE-specific way, and a channel state is measured based on a CSI-RS that is transmitted at a relatively low frequency. Since overhead attributable to reference signals is minimized, reception performance is improved and radio resources may be efficiently used.

Accordingly, the scheduling of DL data through the NCT can be performed by managing only transmission mode (e.g., transmission mode 8 or 9) that is included in DL transmission modes and that is based on a DM-RS, in particular.

Even in data transmission based on the NCT, to perform synchronization/tracking and various types of measurement may be required. To this end, a method in which a Primary Synchronization Signal (PSS)/Secondary Synchronization Signal (SSS) and/or a CRS are transmitted may be taken into consideration. In this case, the PSS/SSS may have a structure that is the same as or different from that of a PSS/SSS defined in LTE releases 8/9/10. The CRS may be partially transmitted through a specific antenna port in a region that corresponds to a k subframe section having a specific cycle in a time axis and that corresponds to specific n RBs (or a PRB pair) in a frequency axis. For example, k=1 and n=6.

In data transmission based on the NCT, the CRS is not used for the demodulation of a control channel and DL data. An additional reference signal may be transmitted for the demodulation of data and the measurement of a channel, and a corresponding signal may be specific to UE. For example, an existing DM-RS may be used for the demodulation of data.

Meanwhile, an LTE system based on TDD requires a timing gap for switch from a DL subframe to an UL subframe. To this end, a special subframe is present between a DL subframe and an UL subframe. A variety of types of special subframe configurations are supported depending on channel conditions and the location of UE. Table 5 is an example of special subframe configurations.

TABLE 5

| Special subframe configurations | Normal CP (DL) | | | Extended CP (DL) | | |
|---|---|---|---|---|---|---|
| | | UpPTS | | | UpPTS | |
| | DwPTS | Normal CP (UL) | Extended CP (UL) | DwPTS | Normal CP (UL) | Extended CP (UL) |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 . T_s$ | | |
| 7 | $21952 \cdot T_s$ | | | — | — | — |
| 8 | $24144 \cdot T_s$ | | | — | — | — |

In this case, $T_s = 1/(15000 \times 2048)$. From Table 5, it may be seen that the DwPTS and the UpPTS are different depending on the normal CP or the extended CP.

Recently, in order to improve efficiency while maintaining coexistence with a different TDD system, such as Time Division-Synchronous CDMA (TD-SCDMA), there has been proposed a new configuration in which the DwPTS includes 6 OFDM symbols and the UpPTS includes 2 OFDM symbols in the normal CP and the DwPTS includes 5 OFDM symbols and the UpPTS includes 2 OFDM symbols in the extended CP. Such a configuration is hereinafter called a "special subframe configuration 9" or a "Conf 9 special subframe". Table 6 is an example of the special subframe configuration 9.

TABLE 6

| Special subframe configuration | Normal CP (DL) | | | Extended CP (DL) | | |
|---|---|---|---|---|---|---|
| | | UpPTS | | | UpPTS | |
| | DwPTS | Normal CP (UL) | Extended CP (UL) | DwPTS | Normal CP (UL) | Extended CP (UL) |
| 9 | $24144 \cdot T_s$ | $4384 \cdot T_s$ | $5120 \cdot T_s$ | — | — | — |

If the NCT is used in a TDD system, a CRS may not be transmitted through a DwPTS section within the Conf 9 special subframe, or the CRS may not be used for the demodulation of a control channel and DL data. In the current LTE specification, a DM-RS pattern in such an assumption has not been described. In order to use the DwPTS to a maximum extent, a DM-RS pattern in the Conf 9 special subframe is preferably designed in 6 OFDM DwPTS symbols in a normal CP and 5 OFDM DwPTS symbols in an extended CP.

DM-RS patterns in a TDD special subframe according to the present invention are described in more detail. The special subframe configuration 9 is described as an example, for convenience of description, but the present invention may be applied to other special subframe configurations, such as the special subframe configurations 1 to 4. Furthermore, the NCT is assumed to be used in an SCell, but the NCT may be used in all cells including a PCell. The present invention is not limited thereto.

<Option 1>

The transmission of an UL grant based on an EPDCCH is permitted in the DwPTS section of a special subframe based on the NCT. In this case, in order to detect the EPDCCH including the UL grant, a separate demodulation RS may be transmitted. The demodulation RS may be called an enhanced DM-RS (EDM-RS) and may have a similar structure as an existing DM-RS.

<Option 2>

The transmission of DL data subjected to cross-carrier scheduling is permitted in the DwPTS section of a special subframe based on the NCT. That is, the transmission of DL data based on a DL grant transmitted through another carrier is permitted. In this case, for the reception of corresponding DL data, a DM-RS may be transmitted. Meanwhile, only the special subframe is subject to cross-carrier scheduling, and other subframes may not be subject to cross-carrier scheduling.

<Option 3>

The transmission of a DL grant based on an EPDCCH and DL data corresponding to the DL grant is permitted in the DwPTS section of a special subframe based on the NCT. In this case, for the detection of the EPDCCH including the DL grant and the reception of the DL data corresponding to the DL grant, an EDM-RS and a DM-RS may be transmitted.

The aforementioned options may be combined. However, since cross-carrier scheduling is now supported for only an SCell, <Option 2> may not be applied if the NCT is used in a PCell.

In a normal CP, in the case of the existing DM-RS, 8 antenna ports are divided into two groups. The two groups share an RE group including 4 REs. The two groups are mapped to different RE groups, and 4 REs included in a single RE group are mapped to different OFDM symbols.

Figure 11:
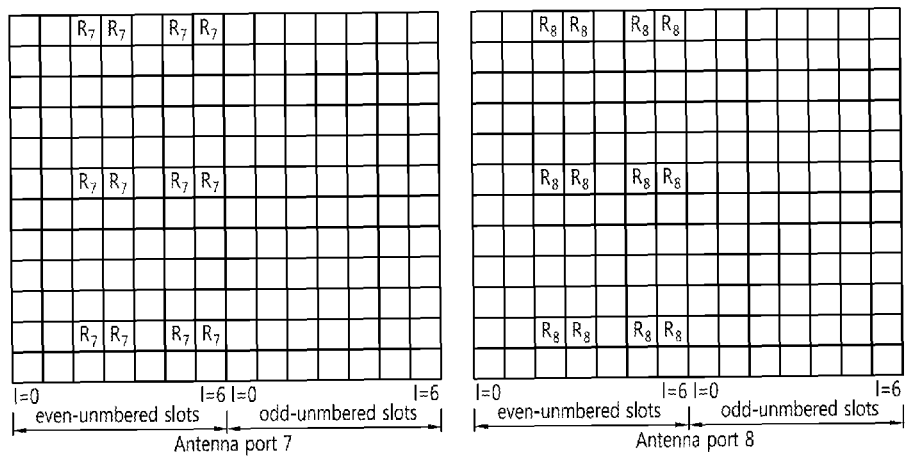
FIG. 11 illustrates a demodulation Reference Signal (DM-RS) pattern for a special subframe configuration 1, 2, 6, or 7.
Figure 11:
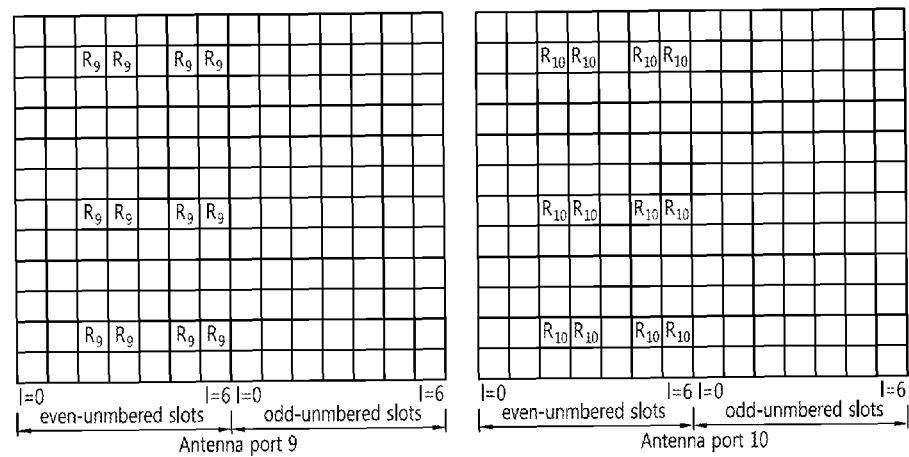

In the current LTE specification, a DM-RS pattern for the special subframe configuration 1, 2, 6, or 7 in which the DwPTS is 9 or 10 OFDM symbols has been described. FIG. 11 illustrates the DM-RS pattern for the special subframe configuration 1, 2, 6, or 7. Referring to FIG. 11, the DM-RS pattern starts from the third OFDM symbol, and a seventh OFDM symbol is required. However, in the special subframe configuration 9, a DM-RS pattern is unable to be used because a DwPTS includes 6 OFDM symbols.

Accordingly, the present invention proposes a new DM-RS pattern that is not transmitted in the seventh OFDM symbol. FIGS. 12 to 19 illustrate DM-RS patterns according to the present invention.

Meanwhile, in accordance with a current LTE specification, in a DwPTS section within a special subframe, a CRS and a PSS are transmitted through first and third OFDM symbols. Assuming that a CRS that reuses an existing pattern is transmitted in the NCT, there are parts that need to be additionally taken into consideration when the aforementioned options and the DM-RS pattern are applied depending on whether or not the CRS and/or the PSS/SSS are transmitted in the DwPTS section within the special subframe. A solution according to each of cases is described below.

<Case 1> A CRS/PSS/SSS are not Transmitted in a Special Subframe

In Case 1, the CRS/PSS/SSS are transmitted in a non-special subframe, and the special subframe does not carry the CRS/PSS/SSS. Since a collision between an RS and an SS is not present, various DM-RS patterns may be used, and an existing DM-RS pattern may be used in the configuration 1, 2, 6, or 7 other than the special subframe configuration 9. Furthermore, all the aforementioned options may be applied.

Figure 12:
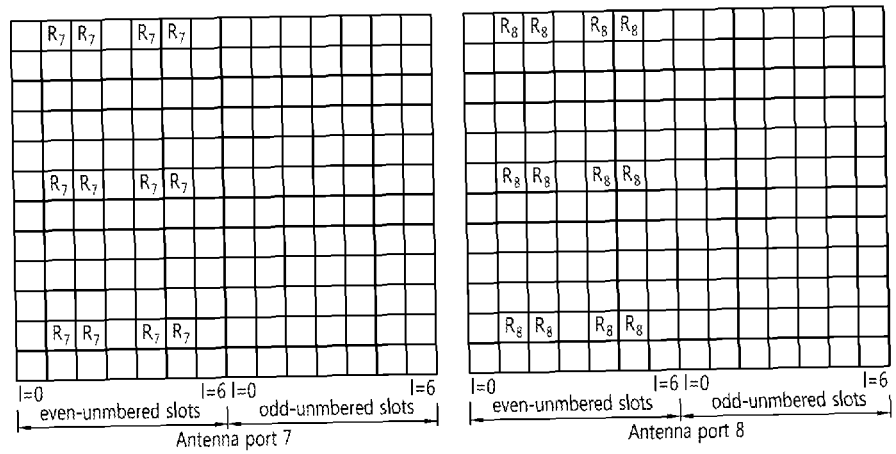
FIGS. 12 to 19 illustrate DM-RS patterns according to the present invention.
Figure 12:
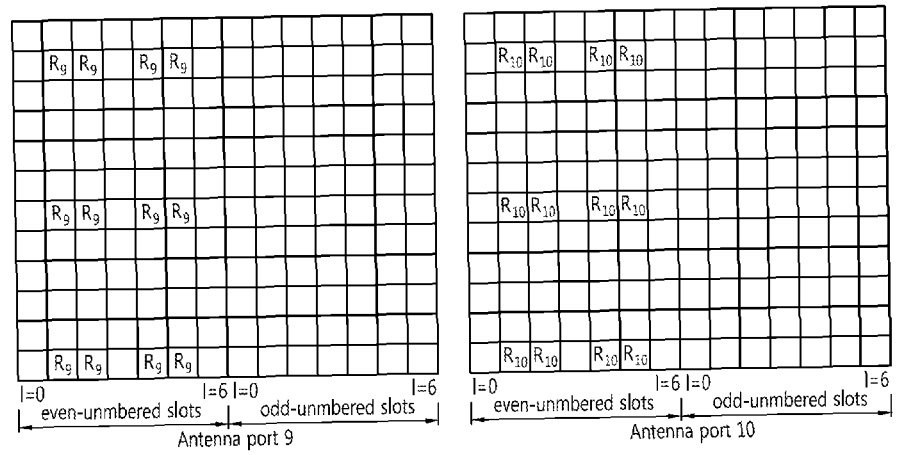
Figure 13:
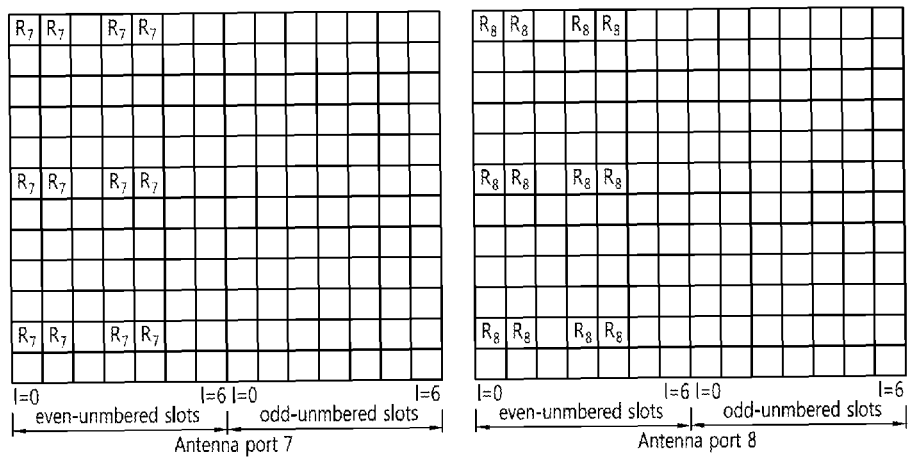
Figure 13:
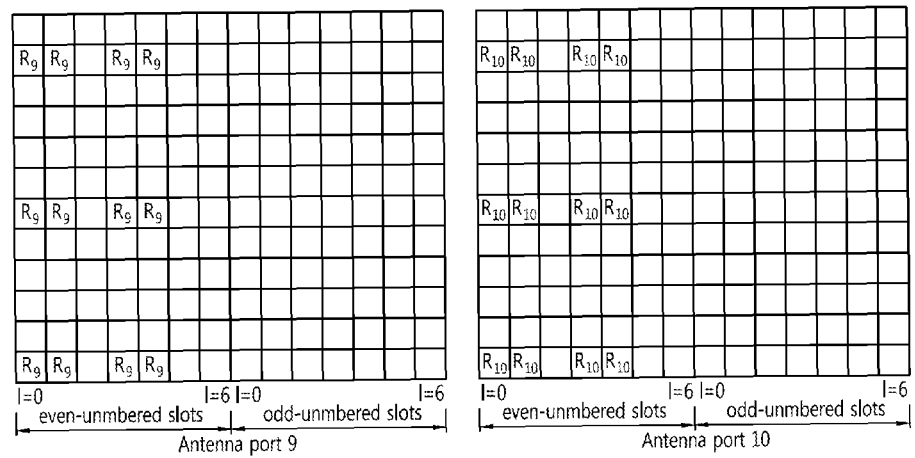

For example, DM-RS patterns of FIG. 12 may be used. FIG. 12 illustrates that the DM-RS pattern for the existing special subframe configuration 1, 2, 6, or 7 has shifted to the left by a single OFDM symbol. Furthermore, as illustrated in FIG. 13, in the DM-RS pattern for the existing special subframe configuration 1, 2, 6, or 7, a DM-RS pattern shifted to the left by two OFDM symbols may be used.

Figure 14:
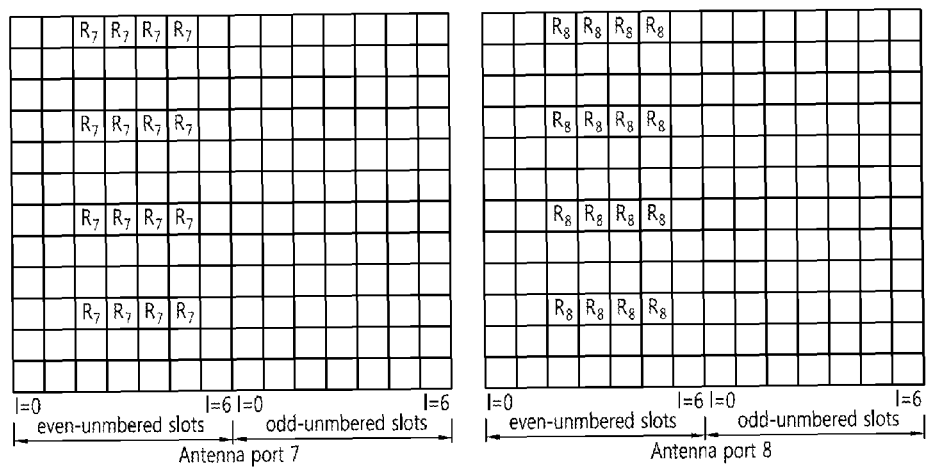
Figure 14:
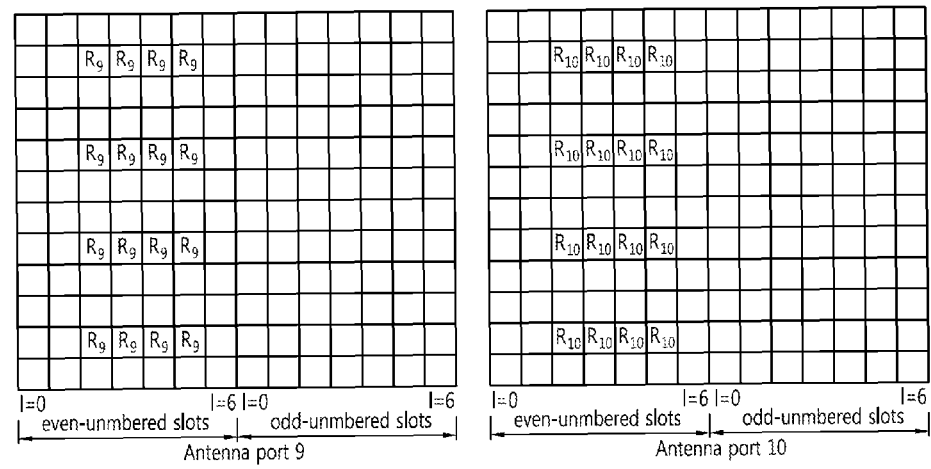

For example, DM-RS patterns of FIG. 14 may be used. The DM-RS patterns of FIG. 14 may be used for the special subframe configuration 9 and may be used for other special subframe configurations. Furthermore, in the illustrated DM-RS pattern, a DM-RS pattern shifted to the left and right by one or two OFDM symbols may be used.

<Case 2> A PSS or an SSS is Transmitted in a Special Subframe

A CRS is not transmitted in the DwPTS section of a special subframe based on the NCT. If only a PSS or an SSS is transmitted, all the aforementioned options may be applied.

1. If a PSS (or SSS) is transmitted in the third OFDM symbol, the PSS (or SSS) may collide against a DM-RS. Two methods may be considered as a solution for the collision.

(1) The location where the PSS (or SSS) is transmitted is shifted to an OFDM symbol 0 or 1 (i.e., the first or the second OFDM symbol). In this case, a DM-RS pattern, such as that of FIG. 15, may be used.

(2) In the DM-RS patterns for the existing special subframe configurations 1, 2, 6, 7, and 9, the PSS (or SSS) is shifted by 2 OFDM symbols so that the DM-RS is not transmitted in the third OFDM symbol. This may be applied to a case where the PSS or the SSS is transmitted in the special subframe of the configuration 3, 4, or 8.

2. If a PSS (or SSS) is transmitted in the first or the second OFDM symbol, the PSS (or SSS) does not collide against a DM-RS for the special subframe configuration 1, 2, 6, or 7. Furthermore, a pattern in which a DM-RS is not transmitted in the first and the second OFDM symbols may be used as a DM-RS pattern for the special subframe configuration 9.

<Case 3> A PSS and an SSS are Transmitted in a Special Subframe

1. If a CRS is not transmitted and a PSS and an SSS are transmitted in the DwPTS section of a special subframe based on the NCT, a proper DM-RS pattern may be selected depending on the locations of the PSS/SSS.

For example, if the PSS/SSS are placed at the OFDM symbols 2 and 5, the pattern of FIG. 13 in which DM-RSs are placed at OFDM symbols 0, 1, 3, and 4 may be selected.

Figure 15:
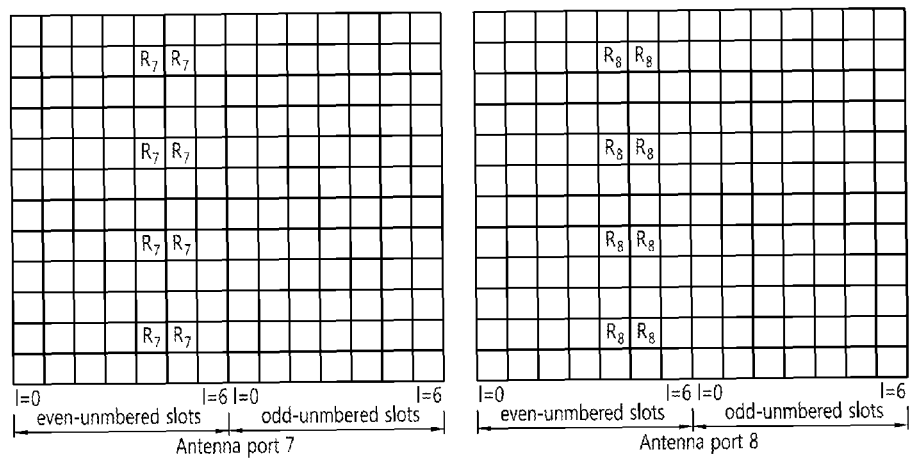
Figure 15:
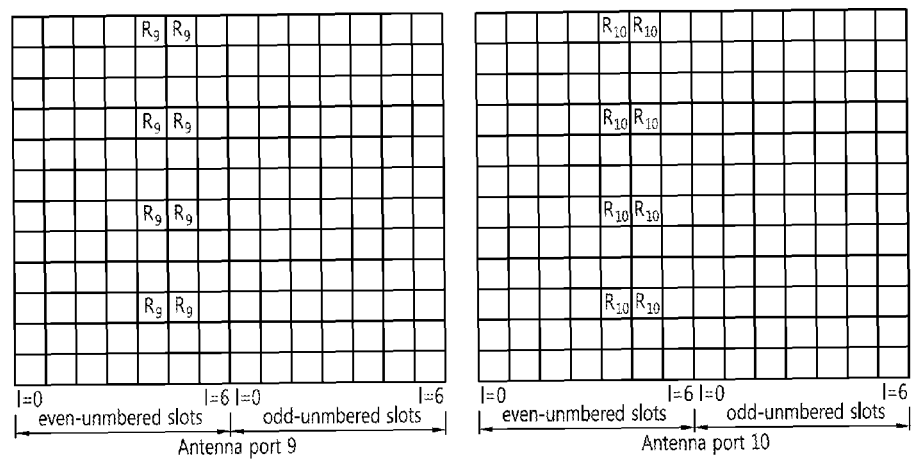

For example, if the PSS/SSS are placed at OFDM symbols 0 and 1, the pattern of FIG. 15 in which DM-RSs are placed at OFDM symbols 2, 3, 4, and 5 may be selected.

Figure 16:
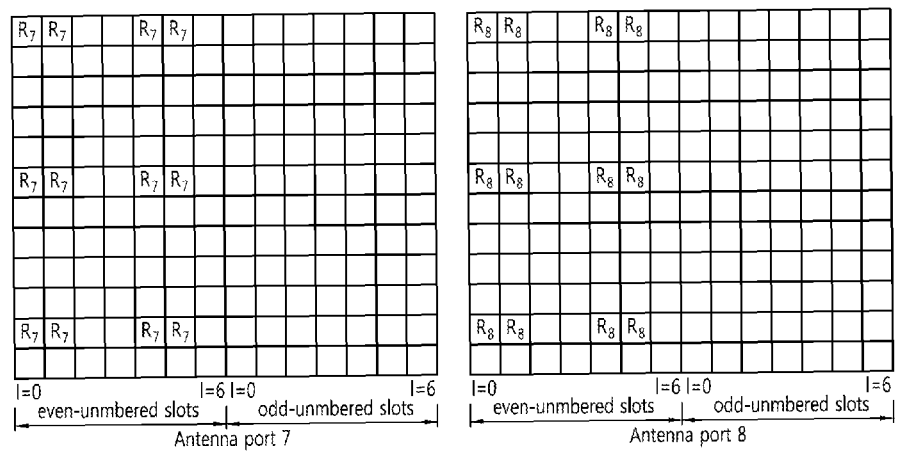
Figure 16:
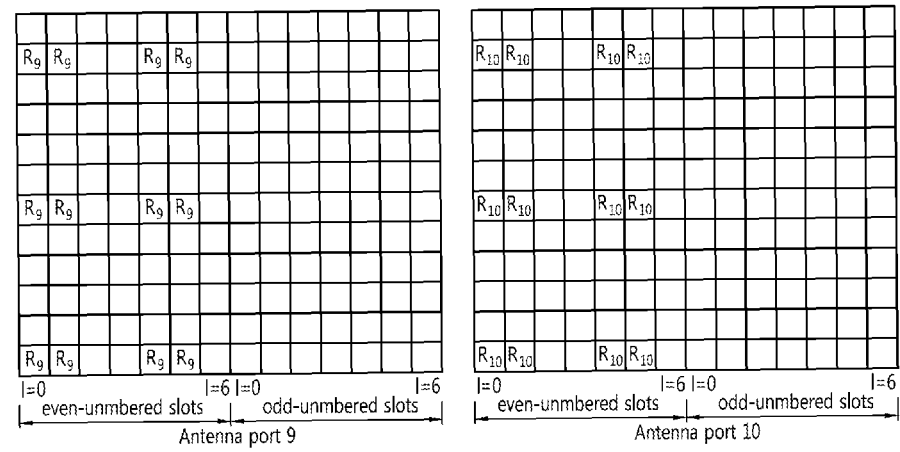

For example, if the PSS/SSS are placed at OFDM symbols 2 and 3, the pattern of FIG. 16 in which DM-RSs are placed at OFDM symbols 0, 1, 4, and 5 may be selected.

Figure 17:
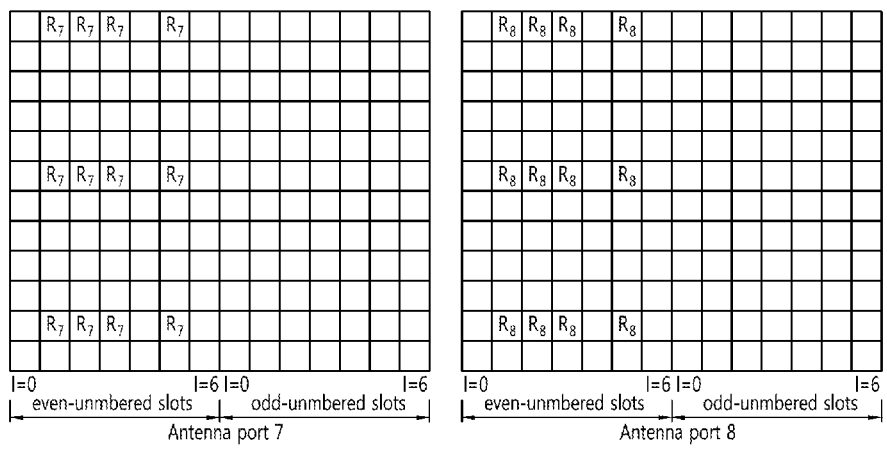
Figure 17:
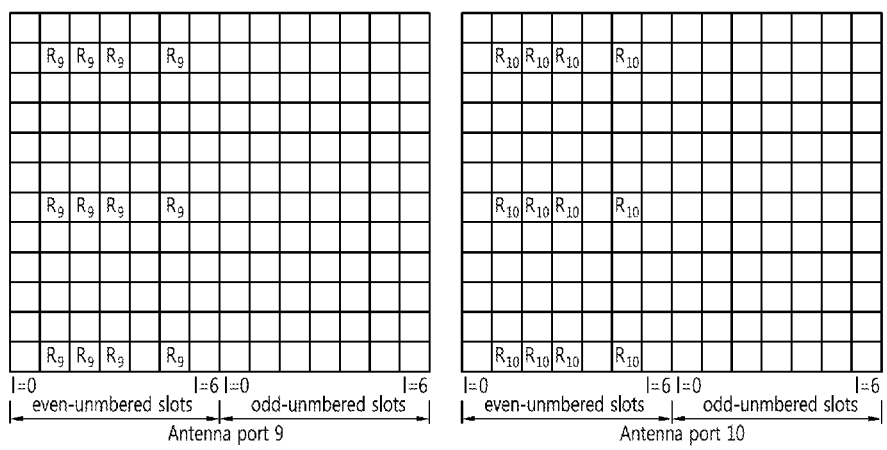

For example, if the PSS/SSS are placed at OFDM symbols 0 and 4, the pattern of FIG. 17 in which DM-RSs are placed at OFDM symbols 1, 2, 3, and 5 may be selected.

Figure 18:
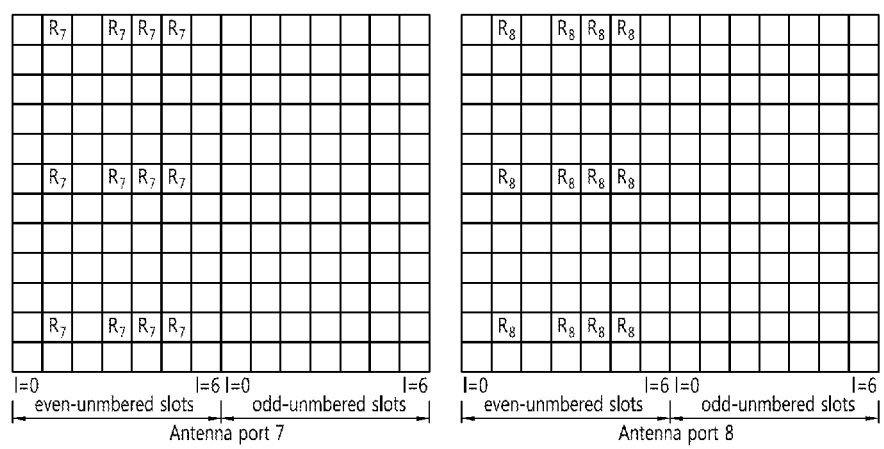
Figure 18:
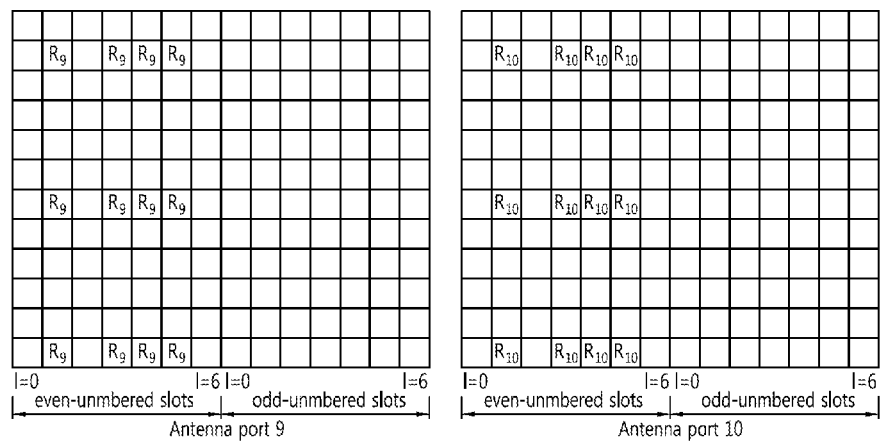

For example, if the PSS/SSS are placed at OFDM symbols 0 and 2, the pattern of FIG. 18 in which DM-RSs are placed at OFDM symbols 1, 3, 4, and 5 may be selected.

Figure 19:
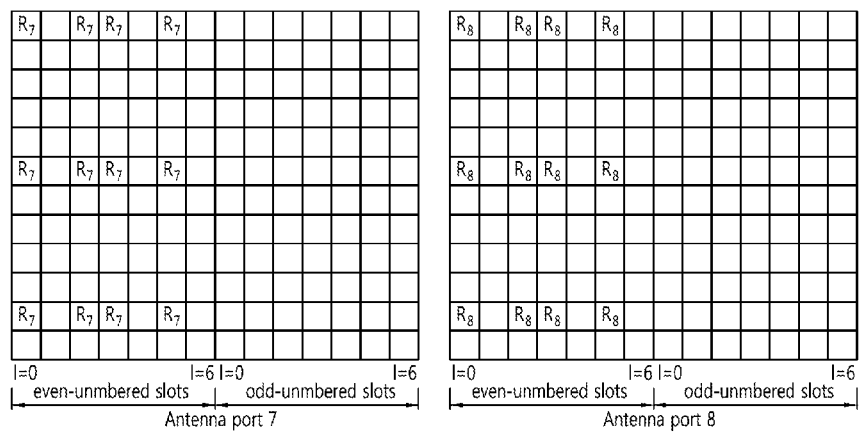
Figure 19:
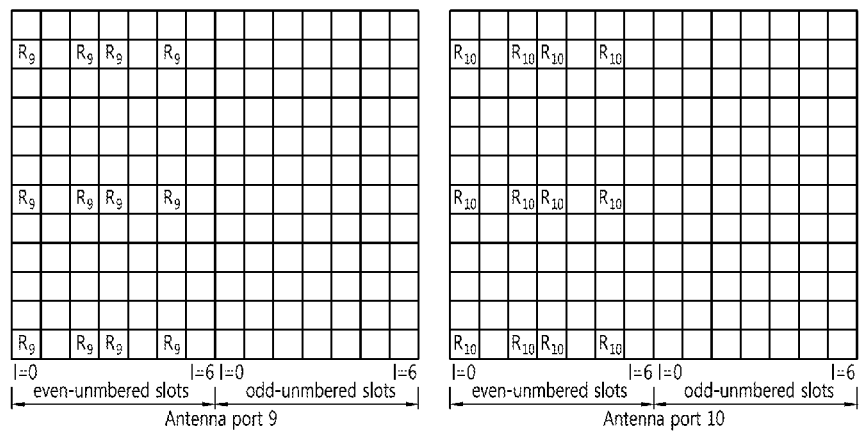

For example, if the PSS/SSS are placed at OFDM symbols 1 and 4, the pattern of FIG. 19 in which DM-RSs are placed at OFDM symbols 0, 2, 3, and 5 may be selected.

The aforementioned illustrative patterns may be used for the special subframe configuration 9, and existing DM-RS patterns may be used for the special subframe configurations 1, 2, 6, and 7.

Meanwhile, in the case of the special subframe configuration 1 or 5, a PSS and an SSS are unable to be transmitted at the same time because a DwPTS includes only 3 OFDM symbols. Accordingly, the use of some (e.g., FIG. 13) of the aforementioned patterns is unable to be used in the special subframe configuration 1 or 5.

2. A method of not sending a DM-RS at center 6 RBs may be taken into consideration. That is, if a PSS and an SSS are transmitted in a special subframe, the center 6RBs may not be used for data transmission.

<Case 4> A CRS is Transmitted in a Special Subframe

If a PSS and an SSS are not transmitted and only a CRS is transmitted in the DwPTS section of a special subframe based on the NCT, all the aforementioned options may be applied. In this case, a DM-RS may be transmitted in the remaining OFDM symbols other than an OFDM symbol (e.g., a symbol 0 and a symbol 4) in which the CRS is transmitted.

For the special subframe configuration 9, a DM-RS pattern, such as that of FIG. 12, may be used. In this case, if a DM-RS and a CRS collide against each other in the fifth OFDM symbol (i.e., symbol 4), the CRS may be punctured.

The DM-RS pattern for the special subframe configuration 9 may be used identically with the DM-RS patterns for the existing special subframe configurations 1, 2, 6, and 7, but the seventh OFDM symbol may be punctured.

In this case, the V shift of a CRS may be disabled.

<Case 4> A CRS/PSS/SSS are Transmitted in a Special Subframe

Not only a CRS, but the PSS and/or the SSS may be transmitted in the DwPTS section of the special subframe based on the NCT.

First, a case where the PSS or the SSS is transmitted in the special subframe is described below. In the case of a normal CP, the PSS or the SSS may be transmitted in the second OFDM symbol of the special subframe in order to avoid a collision with the CRS and a DM-RS, and a corresponding SSS or PSS may be transmitted in the fifth OFDM symbol of the second slot of a previous subframe. In this case, a gap between the PSS and the SSS is 3 OFDM symbols, which is 1 OFDM symbol greater than a gap defined in the current LTE specification. In the case of an extended CP, the PSS or the SSS may be transmitted in the second OFDM symbol, and a corresponding SSS or PSS may be transmitted in the fourth OFDM symbol of the second slot of a previous subframe.

A case where both the PSS/SSS are transmitted in the special subframe is described below. A CRS pattern includes OFDM symbols 0 and 4 in an antenna port 0, and a DM-RS pattern includes OFDM symbols 5 and 6 in a normal subframe. Accordingly, the PSS and the SSS may be transmitted in an OFDM symbol 1, 2, or 3 in order to avoid a collision with the CRS and a DM-RS.

Meanwhile, a method in which a PSS/SSS does not schedule any data at center 6 RBs in which a DM-RS may collide may be taken into consideration.

The aforementioned DM-RS patterns may be used in normal subframes as well as in special subframes. A CRS and a DM-RS may share the same symbol index, and a multiplexing mechanism, such as a V-shift, may be used in order to avoid a collision. If a PSS and/or an SSS collide against a DM-RS, a DM-RS may be punctured.

A DM-RS pattern for a special subframe in an extended CP may be defined by shifting the DM-RS patterns for the special subframe configurations 1, 2, 3, 5, and 6, described in the current LTE specification by one or more symbols or adding one or more symbols between two DM-RS REs.

Meanwhile, a V-shift or an H-shift may be applied to a DM-RS pattern based on the conditions of a BS. In this case, a DM-RS may be multiplexed with a CRS and subject to a V-shift or H-shift.

Figure 20:
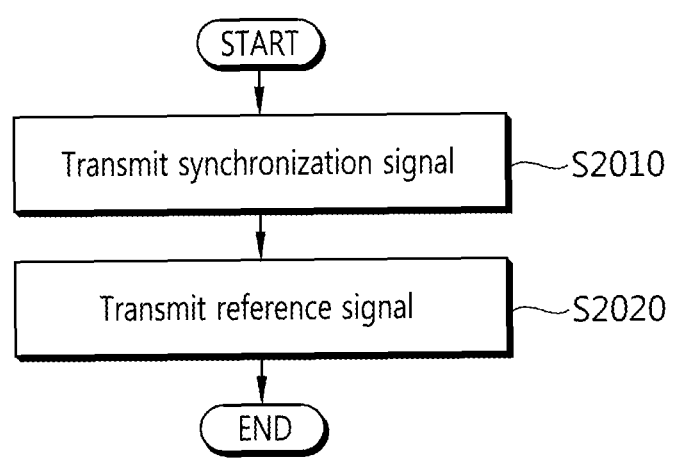
FIG. 20 illustrates a method for transmitting reference signals in a wireless communication system based on TDD in accordance with an embodiment of the present invention.

FIG. 20 illustrates a method for transmitting reference signals in a wireless communication system based on TDD in accordance with an embodiment of the present invention.

A BS may send reference signals, such as a PSS and an SSS, in a special subframe (S2010). As described above, the special subframe includes a DwPTS, a GP, and an UpPTS. For example, the DwPTS of the Conf 9 special subframe include 6 OFDM symbols, and the UpPTS thereof includes 2 OFDM symbols.

The BS may send a DM-RS in a corresponding special subframe (S2020). As described above, the DM-RS is generated based on the identifier of UE and is used to demodulate a downlink control channel and/or downlink data.

Since various types of signals are transmitted in the same subframe, a collision between the signals may occur. Accordingly, in order to prevent a collision with a CRS and/or a PSS/SSS, DM-RS patterns, such as those of FIGS. 12 to 19, may be used. For example, as illustrated in FIG. 12, a DM-RS may be transmitted and received in the second, the third, the fifth, and the sixth OFDM symbols.

Figure 21:
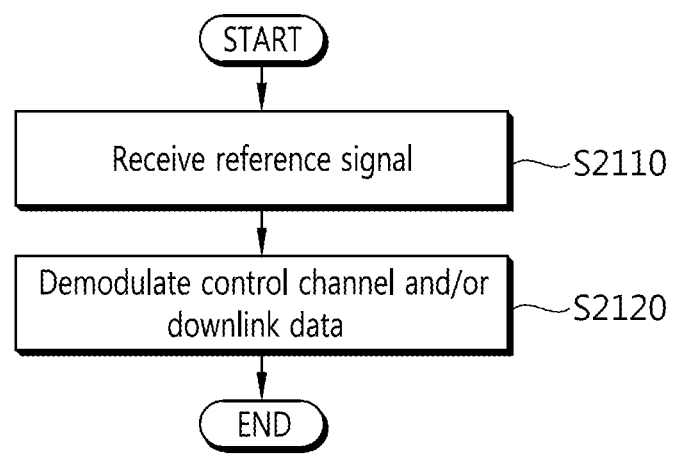
FIG. 21 illustrates a method for receiving data in a wireless communication system based on TDD in accordance with an embodiment of the present invention.

FIG. 21 illustrates a method for receiving data in a wireless communication system based on TDD in accordance with an embodiment of the present invention.

UE may receive a reference signal, such as a DM-RS, in a special subframe (S2110). As described above, the special subframe includes a DwPTS, a GP, and an UpPTS. For example, the DwPTS of the Conf 9 special subframe includes 6 OFDM symbols, and the UpPTS thereof includes 2 OFDM symbols.

The UE demodulates a control channel or downlink data based on the reference signal (S2120). The reference signal may be transmitted through DM-RS patterns, such as those of FIGS. 12 to 19, in order to prevent a collision with a CRS and/or a PSS/SSS. For example, as illustrated in FIG. 12, a DM-RS may be transmitted and received in the second, the third, the fifth, and the sixth OFDM symbols.

Figure 22:
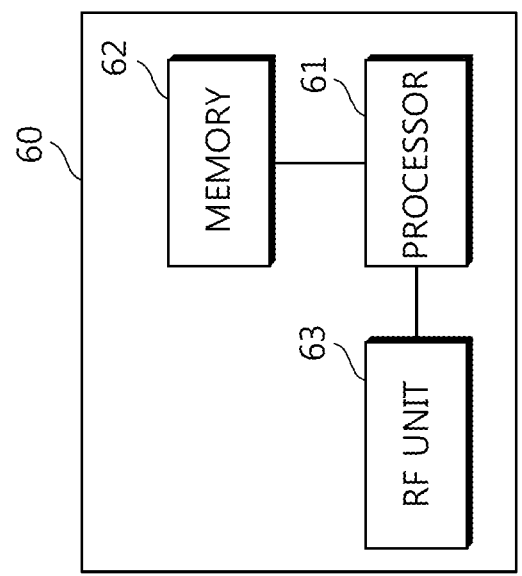
FIG. 22 is a block diagram illustrating a wireless communication system in which an embodiment of the present invention is implemented.
Figure 22:
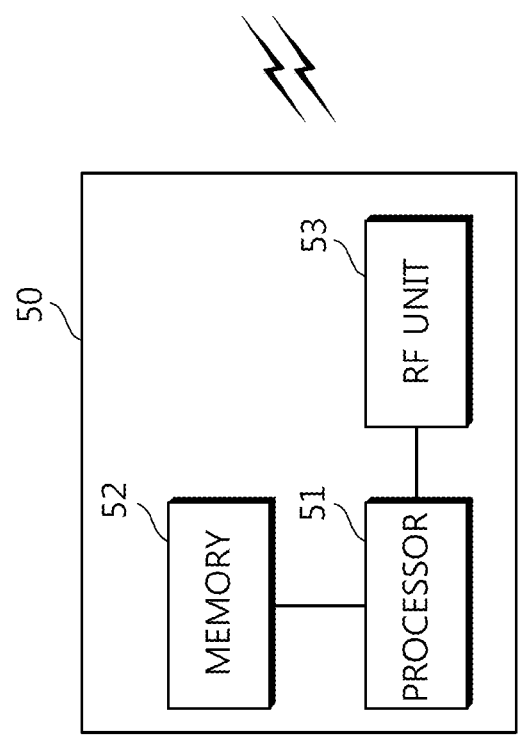

FIG. 22 is a block diagram illustrating a wireless communication system in which an embodiment of the present invention is implemented.

A BS 50 includes a processor 51, memory 52, and a Radio Frequency (RF) unit 53. The memory 52 is connected to the processor 51 and stores various pieces of information for driving the processor 51. The RF unit 53 is connected to the processor 51 and sends and/or receives radio signals. The processor 51 implements the proposed functions, processes and/or methods. In the aforementioned embodiments, the operation of the BS may be implemented by the processor 51.

UE 60 includes a processor 61, memory 62, and an RF unit 63. The memory 62 is connected to the processor 61 and stores various pieces of information for driving the processor 61. The RF unit 63 is connected to the processor 61 and sends and/or receives radio signals. The processor 61 implements the proposed functions, processes and/or methods. In the aforementioned embodiments, the operation of the UE may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting reference signals in a wireless communication system based on Time Division Duplex (TDD), the method comprising:
transmitting, by a transmitter, a synchronization signal in a subframe, the subframe comprising K (K>1) Orthogonal Frequency Division Multiplexing (OFDM) symbols in a time domain and N resource blocks in a frequency domain, where N is an integer; and
transmitting, by the transmitter, a reference signal in the subframe, the reference signal being generated based on a user equipment's identifier,
wherein the subframe comprises a Downlink Pilot Time Slot (DwPTS), a Guard Period (GP) and an Uplink Pilot Time Slot (UpPTS), the DwPTS comprising 6 OFDM symbols, the UpPTS comprising 2 OFDM symbols when each OFDM symbol included in the subframe includes a normal cyclic prefix (CP),
wherein the subframe comprises the DwPTS, the GP and the UpPTS, the DwPTS comprising 5 OFDM symbols, the UpPTS comprising 2 OFDM symbols when each OFDM symbol included in the subframe includes an extended CP, wherein the reference signal is transmitted in at least one of a first OFDM symbol to a sixth OFDM symbol of the subframe except at least one OFDM symbol for the synchronization signal, wherein the synchronization signal includes a Primary Synchronization Signal (PSS), wherein the PSS is transmitted on a second OFDM symbol included in the subframe to avoid a collision with the reference signal when each OFDM symbol included in the subframe includes the normal CP or the extended CP, wherein a Secondary Synchronization Signal (SSS) is transmitted on a fifth OFDM symbol included in a previous subframe of the subframe when each OFDM symbol included in the previous subframe and each OFDM symbol included in the subframe includes the normal CP, and wherein the SSS is transmitted on a fourth OFDM symbol included in the previous subframe of the subframe when each OFDM symbol included in the previous subframe and each OFDM symbol included in the subframe includes the extended CP.

2. The method of claim 1, wherein the DwPTS carries a downlink control channel demodulated by the reference signal.

3. A method for receiving reference signals in a wireless communication system based on Time Division Duplex (TDD), the method comprising:

receiving, by a receiver, a reference signal in a subframe, the subframe comprising K (K>1) Orthogonal Frequency Division Multiplexing (OFDM) symbols in a time domain and N resource blocks in a frequency domain, where N is an integer; and demodulating, by the receiver, a control channel or downlink data based on the reference signal, wherein the subframe comprises a Downlink Pilot Time Slot (DwPTS), a Guard Period (GP), and an Uplink Pilot Time Slot (UpPTS), the DwPTS comprising 6 OFDM symbols, the UpPTS comprising 2 OFDM symbols when each OFDM symbol included in the subframe includes a normal cyclic prefix (CP), wherein the subframe comprises the DwPTS, the GP and the UpPTS, the DwPTS comprising 5 OFDM symbols, the UpPTS comprising 2 OFDM symbols when each OFDM symbol included in the subframe includes an extended CP, wherein the reference signal is received in at least one of a first OFDM symbol to a sixth OFDM symbol of the subframe except at least one OFDM symbol for a synchronization signal, wherein the synchronization signal includes a Primary Synchronization Signal (PSS), wherein the PSS is received on a second OFDM symbol included in the subframe to avoid a collision with the reference signal when the each of OFDM symbols included in the subframe includes the normal CP or the extended CP, wherein a Secondary Synchronization Signal (SSS) is received on a fifth OFDM symbol included in a previous subframe of the subframe when each OFDM symbol included in the previous subframe and each OFDM symbol included in the subframe includes the normal CP, and wherein the SSS is received on a fourth OFDM symbol included in the previous subframe of the subframe when each OFDM symbol included in the previous subframe and each OFDM symbol included in the subframe includes the extended CP.

4. A user equipment in a wireless communication system, comprising:

a Radio Frequency (RF) unit configured to transmit and receive radio signals; and a processor connected to the RF unit and configured to:

receive a reference signal in a subframe, the subframe comprising K (K>1) Orthogonal Frequency Division Multiplexing (OFDM) symbols in a time domain and N resource blocks in a frequency domain, where N is an integer; and demodulate a control channel or downlink data based on the reference signal, wherein the subframe comprises a Downlink Pilot Time Slot (DwPTS), a Guard Period (GP), and an Uplink Pilot Time Slot (UpPTS), the DwPTS comprising 6 OFDM symbols, the UpPTS comprising 2 OFDM symbols when each OFDM symbol included in the subframe includes a normal cyclic prefix (CP), wherein the subframe comprises the DwPTS, the GP and the UpPTS, the DwPTS comprising 5 OFDM symbols, the UpPTS comprising 2 OFDM symbols when each OFDM symbol included in the subframe includes an extended CP, wherein the reference signal is received in at least one of a first OFDM symbol to a sixth OFDM symbol of the subframe except at least one OFDM symbol for a synchronization signal, wherein the synchronization signal includes a Primary Synchronization Signal (PSS), wherein the PSS is received on a second OFDM symbol included in the subframe to avoid a collision with the reference signal when each OFDM symbol included in the subframe includes the normal CP or the extended CP, wherein a Secondary Synchronization Signal (SSS) is received on a fifth OFDM symbol included in a previous subframe of the subframe when each OFDM symbol included in the previous subframe and each OFDM symbol included in the subframe includes the normal CP, and wherein the SSS is received on a fourth OFDM symbol included in the previous subframe of the subframe when each OFDM symbol included in the previous subframe and each OFDM symbol included in the subframe includes the extended CP.

\* \* \* \* \*